United States Patent
Shimizu et al.

(10) Patent No.: US 6,332,653 B1
(45) Date of Patent: Dec. 25, 2001

(54) DISC WHEEL FOR PASSENGER CAR

(75) Inventors: Kiichi Shimizu, Anjo; Shigemasa Takagi, Hashima, both of (JP)

(73) Assignees: Central Motor Wheel Co., Ltd., Anjo; Fuji Seiko Co., Hashima, both of (JP)

( * ) Notice: Subject to any disclaimer, the term of this patent is extended or adjusted under 35 U.S.C. 154(b) by 0 days.

(21) Appl. No.: 09/390,371

(22) Filed: Sep. 7, 1999

(30) Foreign Application Priority Data

| Sep. 8, 1998 | (JP) | 10-253476 |
| Sep. 8, 1998 | (JP) | 10-253477 |
| Sep. 8, 1998 | (JP) | 10-253478 |
| Sep. 8, 1998 | (JP) | 10-253479 |

(51) Int. Cl.$^7$ .................. B60B 3/10; B60B 1/06
(52) U.S. Cl. ........................... 301/63.1; 301/65
(58) Field of Search .................. 301/63.1, 65, 62

(56) References Cited

U.S. PATENT DOCUMENTS

| 2,088,992 | * | 8/1937 | Bierwirth et al. | 301/63.1 |
| 2,090,254 | * | 8/1937 | Eksergian | 301/63.1 |
| 3,506,311 | * | 4/1970 | Nobach | 301/63.1 |
| 3,601,450 | * | 8/1971 | Baker | 301/63.1 |
| 3,627,382 | * | 12/1971 | Lejeune | 301/63.1 |
| 4,106,172 | * | 8/1978 | Bache | 301/63.1 |
| 4,610,482 | * | 9/1986 | Overbeck et al. | 301/63.1 |
| 5,466,050 | * | 11/1995 | Botterman et al. | 301/65 |
| 5,544,945 | * | 8/1996 | Daudi | 301/63.1 |
| 5,577,810 | * | 11/1996 | Abe et al. | 301/63.1 |
| 5,951,114 | * | 9/1999 | Marron et al. | 301/63.1 |

FOREIGN PATENT DOCUMENTS

| 1-104423 | 4/1989 | (JP) . |
| 07257101 | 10/1995 | (JP) . |
| 10-180400 | 7/1998 | (JP) . |
| 10180400 | 7/1998 | (JP) . |

* cited by examiner

Primary Examiner—S. Joseph Morano
Assistant Examiner—Jason R. Bellinger
(74) Attorney, Agent, or Firm—Connolly Bove Lodge & Hutz LLP.

(57) ABSTRACT

A disc wheel for a passenger car has a plate-like rim and a plate-like disc, the disc having a hub mounting portion extending in a direction perpendicular to an axis thereof, a hat middle portion continuously extending from the hub mounting portion toward an outer side in a radial direction and an outer side in an axial direction, a hat top portion continuously extending from the hat middle portion, and a ventilation hole portion continuously extending from the hat top portion toward an inner peripheral surface of the rim and a flange portion continuously extending from the ventilation hole portion and fitted to the inner peripheral surface of the rim. In the disc wheel, the rim inner peripheral surface and the disc flange are welded. Further, the disc has ventilation holes. In the disc wheel for the passenger car, in order to reduce a weight without reducing a fatigue life in a rotational bending fatigue test, a thickness of the disc wheel is varied in a diametrical direction at at least one of the hub mounting portion, the hat middle portion, the hat top portion, the ventilation hole portion and the flange portion.

16 Claims, 22 Drawing Sheets

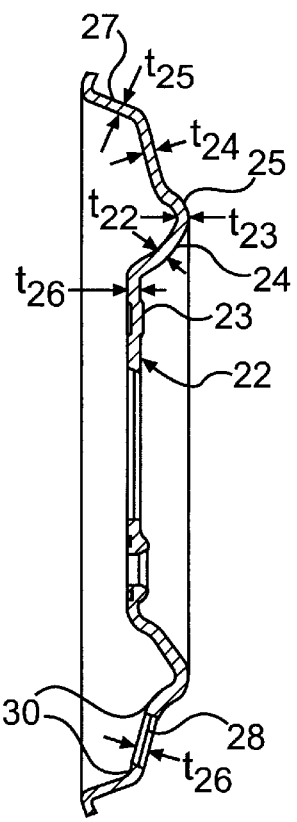 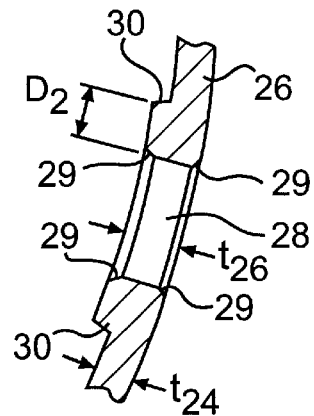
FIG. 15A  FIG. 15B
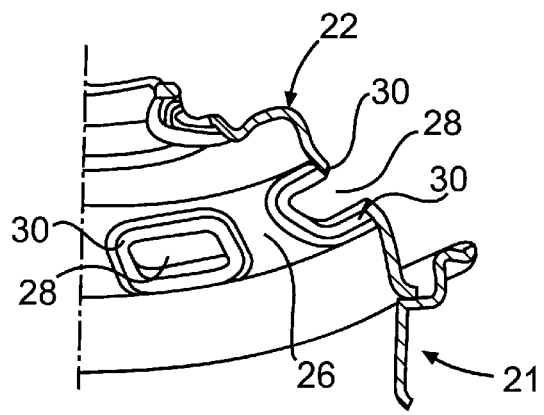
FIG. 16

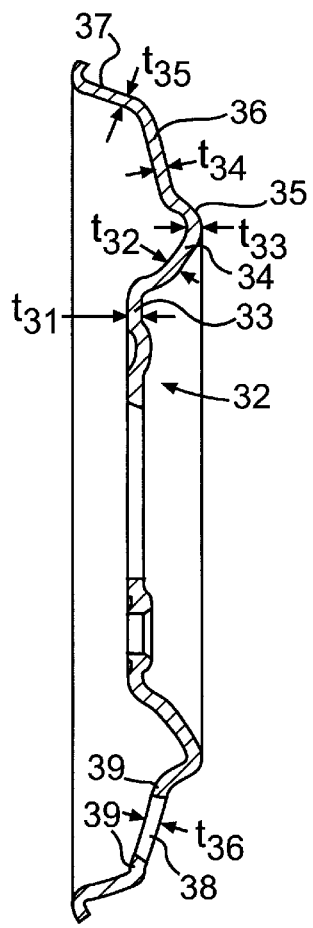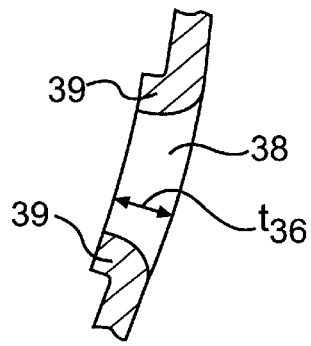
FIG. 21A  FIG. 21B
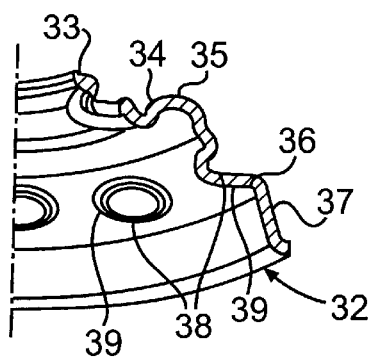
FIG. 22

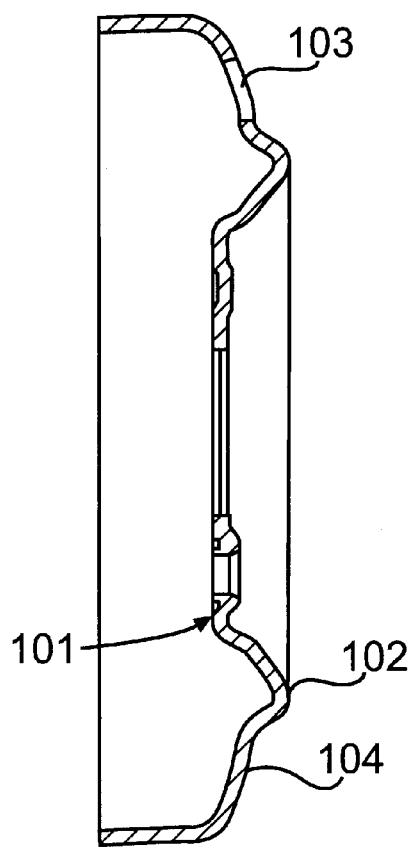
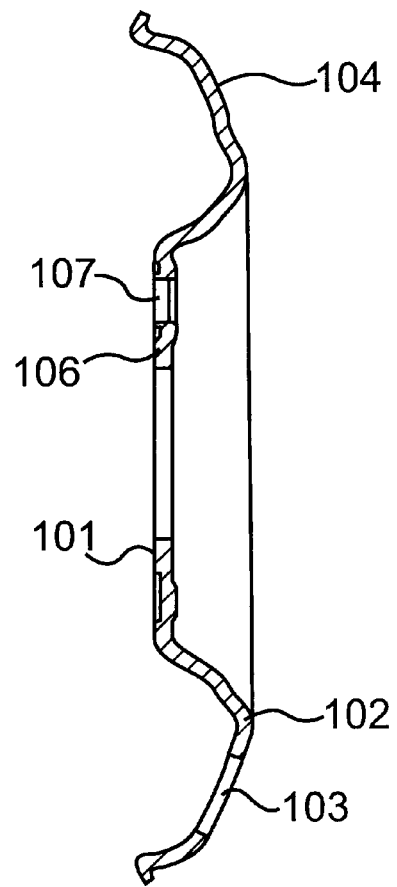
FIG. 25A
PRIOR ART
FIG. 25B
PRIOR ART

DISC WHEEL FOR PASSENGER CAR

BACKGROUND OF THE INVENTION

FIELD OF THE INVENTION

The present invention relates to a disc wheel for a passenger car.

Conventionally, the plate-like disc in a discs used wheel for motor vehicles such as passenger cars, motor trucks and the like are press formed. In such press formation, it is difficult to set the distribution of the thickness of the disc to a preferred level, and a description of the problems resulting follows.

Generally, in order to emit a breaking heat, the disc wheel for a motor vehicle is formed with a ventilation hole 103 in a portion outside a hat portion 102 of a disc 101, as shown in FIGS. 25A and 25B. Accordingly, this ventilation hole portion 104 generally weakens in a rotational bending fatigue test and a crack 105 is generated in the ventilation hole portion 104, as shown in FIGS. 26A, 26B and 26C. In order to strengthen this, it is necessary to increase the thickness of the portion 104. Further, in some cross sectional shapes, a bolt hole 10 may weaken the hub mounting portion 106 and generate a crack 105.

Accordingly, in the structure formed by a press molding as mentioned above, the ventilation hole portion 104 or the hub mounting portion 106 can only have adequate strength by being as thick as the whole of the disc, and must be at least as thick as the weakest portion. Accordingly, unless the strength of the ventilation hole portion 104 or the hub mounting portion 106 can be improved, a reduction of weight is limited.

Furthermore, when the thickness of the whole of the disc is increased, the stress in the welding portion between the disc and a rim generates a crack 105' in the rim drop portion of a welding portion WO, as shown in FIG. 26A.

Moreover, in order to prevent interference with the brake portion 400 as shown in FIGS. 4 and 10 and improve the design, the shape of the disc is frequently limited. Accordingly, an optimum shape is impossible to achieve and the stress balance deteriorates, so that in many cases, the fatigue life cannot be improved without increasing the thickness. As mentioned above, when partially increasing thickness, it is necessary to increase the thickness of the whole disc and the amount of weight that can be reduced is limited Furthermore, in a double mounting type disc wheel used in a motor truck and a motor bus, the thickness of the joint welding portion 203 in the disc 202 with respect to a rim 201 is less than the thickness of a hub mounting portion 204, and the thickness of the hat portion 205 is less than the thickness of the joint welding portion 203, as shown in FIG. 27, which produces a disc wheel having uneven thickness. This type of disc wheel is, for example, disclosed in Japanese Patent Unexamined Publication No. 7-257101. This structure aims to prevent stress on the joint welding portion 203 in the disc, improve the fatigue strength and to reduce weight. However, if a disc wheel with uneven thickness is used in the hat portion, ventilation holes are formed in the thin hat portion 205, so that the crack mentioned above is generated in the hat portion 205

Also, as shown in FIG. 27, the thickness of the flange portion corresponding to the joint welding portion 203 in the disc 202 is generally greater than the thickness of the hat portion 205. Although, the flange portion 203 may have a low stress ratio and a reduced thickness but the rim can be made thinner than the disc, and a significant difference in thickness between the rim and the disc can cause stress that easily produces a crack in the rim side of the welding portion $W_O$ with respect to the wheel strength.

Accordingly, as mentioned above, when the flange portion in the disc 202 is thick, it is necessary to make the rim thick in order to secure fatigue strength and reduce the difference in thickness, so that it increases the weight of the wheel.

Furthermore, although a disc wheel with uneven thickness in a passenger car shown in FIG. 28, and disclosed in Japanese Patent Unexamined Publication No. 1-104423, contains a method of applying an excess metal 303 to a hat R portion 302 of a disc 301 so as to increase the thickness, the thickness of the ventilation hole portion 304 is not increased in the disc and the same crack mentioned above is easily generated in the ventilation hole portion 304.

SUMMARY OF THE INVENTION

Accordingly, an object of the present invention is to provide a disc wheel for a passenger car, especially a disc wheel for a passenger car fitting the flange of the disc proportionate to a drop portion of a rim, which improves stress balance, improves the fatigue life in a rotational bending fatigue test, reduces weight, and prevents a crack in the ventilation hole portion.

In order to solve the problem mentioned above, in accordance with the present invention, there is provided a disc wheel for a passenger car comprising a plate-like rim, a plate-like disc, the disc having a hub mounting portion extending in a direction perpendicular to the axis thereof, a hat middle portion continuously extending from the hub mounting portion toward the outer side in a radial direction the outer side in an axial direction, a hat top portion continuously extending from the hat middle portion, a ventilation hole portion continuously extending from the top portion toward an inner peripheral surface of the rim and a flange portion continuously extending from the ventilation hole portion and fitted in the inner peripheral surface of the rim, and the rim inner peripheral surface and the disc flange being welded, wherein the thickness of the disc is varied in a diametrical direction at to either the hub mounting portion, the hat middle portion the hat top portion, the ventilation hole portion, or the flange portion.

In the first aspect of the present invention, the structure can be made such that the thickness of the hub mounting portion is equal to or less than the original thickness of the raw material, the thickness of the hat middle portion and the hat top portion is less than that of the hub mounting portion thickness of the ventilation hole portion is set to be original thickness of the raw material, and the thickness of the flange portion is less than thickness of any portion between the hub mounting portion and the ventilation hole portion.

Although the hat outer peripheral portion of the disc is inherently structured so that stress ratio is low thickness is small, the ventilation hole is formed in the hat outer peripheral portion such as the disc wheel for the passenger car and reduces the cross sectional area at this portion is reduced and a rigidity is lowered. Further, a stress is concentrated to the ventilation hole portion and a crack is easily generated Therefore, according to the first aspect, it is possible to increase the rigidity and reduce the stress ratio of the ventilation hole portion by increasing the thickness of the ventilation hole portion.

Accordingly, it is possible to make the stress balance optimum by setting the thickness in each of the portions as in the present invention.

Also, in the first aspect mentioned above, the structure can be made so that when setting the thickness of the raw material of the disc to 1, the thickness of the hub mounting portion is between 0.8 and 1.0, the thicknesses of the hat middle portion and the hat top portion are between 0.75 and 0.90, the thickness of the ventilation hole portion extending from the hat top portion to the flange portion is the thickness of the flange portion is between 0.5 and 0.7, and a rounded portion connecting the respective portions can be a gradually changing rounded portion In this structure, the same operation as that of the first aspect can be obtained.

Furthermore, in the structure mentioned above, the thickness of the drop portion in the rim can be between 0.4 and 0.7 when setting the thickness of the raw material of the disc to 1.

In accordance with the first aspect, since the flange portion of the disc is made thin as mentioned above, it is possible to reduce the difference in thickness between the flange portion and the drop portion by reducing the thickness of the drop portion in the rim to which the flange portion is fitted. Accordingly, it is possible to reduce the thicknesses of the flange portion and the drop portion so as to decrease the weight of the disc wheel.

Also, in the structure mentioned above a chamfering can be applied to a sharp edge in the ventilation hole formed in the ventilation hole portion.

Generally, since the ventilation hole is formed by a piercing process, the sharp edge is generated at the time of processing so that notch sensibility is increased, and contributes to a reduced fatigue life. However, in accordance with the present invention, chamfering the sharp edge reduces the influence of the notch so that it prevents cracking.

Furthermore, in order to solve the problem mentioned above, in accordance with the second aspect of the present invention, the structure can be made so that the thickness of the hub mounting portion equal to or less than the original thickness of the raw material, the thicknesses of the hat middle portion and the hat top portion are less than that of the hub mounting portion, the thickness of the ventilation hole portion is equal to the original thickness of the raw material, and the thickness of the flange portion is less than that of the hat middle portion and the hat top portion.

As mentioned above, the hat outer peripheral portion of the disc is inherently structured so that stress ratio can be low and thickness can be light, but, the ventilation hole is formed in the hat outer peripheral portion in a disc wheel for a passenger car, a cross sectional area at this portion is reduced and rigidity is lowered. Furthermore, stress on the ventilation hole portion often causes a crack to form.

Therefore, in accordance with the second aspect, it is possible to increase the rigidity and reduce the stress ratio in the ventilation hole portion by increasing the thickness thereof.

Accordingly, it is possible optimize the stress balance by setting the thickness in each of the portions in the present invention. Furthermore, in the second aspect mentioned above, the structure can be made such that when setting the thickness of the raw material of the disc to 1, the thickness of the hub mounting portion is between 0.8 and 1.0, the thicknesses of the hat middle portion and the hat top portion are between 0.75 and 0.90, the thickness of the ventilation hole portion extending from the hat top portion to the flange portion is 1.0, the thickness of the flange portion is between 0.55 and 0.75, and the rounded portion connecting the respective portions is a gradually changing rounded portion.

In accordance with this structure, the operation of the second aspect mentioned above is achievable.

Also, in the structure mentioned above, a chamfering may be applied to a sharp edge in the ventilation hole formed therein in the same manner as that mentioned above Moreover, in order to solve the problem mentioned above in accordance with the third aspect of the present invention, the structure can be made such that the thickness of the hub mounting portion, the hat middle portion and the hat top portion is set to be substantially equal to the original thickness of the raw material, the thickness of the ventilation hole portion and the flange portion are equal to each other and less than that of the hat top portion, and the thickness around the ventilation hole is approximately 1.0 to 1.3 times the original thickness of the raw material and formed in a convex shape As mentioned above, the hat outer peripheral portion of the disc is inherently structured so that the stress ratio can be low and thickness can be light, but the ventilation hole being formed in the hat outer peripheral portion in a disc wheel for a passenger car reduces the portion of the cross sectional area and decreases rigidity. Also, stress on the ventilation hole portion often causes a crack to form.

Therefore, in accordance with the third aspect, it is possible to increase the rigidity and reduce the stress ratio in the ventilation hole portion by forming a convex portion around the ventilation hole so as to increase the thickness thereof.

Accordingly, it is possible to optimize the stress balance by setting the thickness in each of the portions as mentioned above Additionally, in the third aspect mentioned above, the structure can be formed so that when setting the thickness of the raw material of the disc to 1, the thicknesses of the hub mounting portion, the hat middle portion and the hat top portion are set to be substantially 1, the thicknesses of the ventilation hole portion and the flange portion are between 0.6 and 0.8, the thickness of the convex portion around the ventilation hole is between 1.0 and 1.3, and a rounded portion connecting the respective portions is a gradually changing rounded portion In accordance with this structure, the operation of the third aspect mentioned above is achievable.

Furthermore, in the structure mentioned above, chamfering can be applied to a sharp edge in the ventilation hole formed therein in the same manner as that mentioned above Also, in order to solve the problem mentioned above, in accordance with a fourth aspect of the present invention, the structure can be formed such that the thickness from the hub mounting portion via the hat middle portion to the hat top portion is set to be substantially equal to the original thickness of the raw material, the thicknesses from the hat middle portion to the ventilation hole portion and the flange portion are less than the thickness of the hub mounting portion, and the inner periphery of the ventilation hole portion is made thicker than the hub mounting portion by a burring process As mentioned above, the hat outer peripheral portion of the disc is inherently structured such that it can be thin with a low stress ratio the ventilation hole being formed in the hat outer peripheral portion in a disc wheel for a passenger car reduces the portion of the cross sectional area and lessens rigidity. Also, stress on to the ventilation hole portion often causes a crack to form.

Therefore, in accordance with the fourth aspect, it is possible to increase the rigidity and reduce the stress ratio in the ventilation hole portion by making the inner peripheral portion of the hole in the ventilation hole portion thicker than the hub mounting portion by a burring process.

Accordingly, it is possible to optimize the stress balance by setting the thickness in each of the portions as mentioned above.

Furthermore, in the fourth feature mentioned above, the structure may be made so that when setting the thickness of the raw material of the disc to 1, the thickness from the hub mounting portion via the hub middle portion to the hat top portion is set to 1, the thicknesses from the hat top portion to the periphery of the ventilation hole portion and the flange portion is between 0.6 and 0.8, the thickness of the bent portion at the inner peripheral edge of the hole portion in the ventilation hole portion is between 1.5 and 2.0, and a rounded portion connecting the respective portions is a gradually changing rounded portion.

In accordance with this structure, the same operation as that of the fourth aspect mentioned above is achievable.

BRIEF DESCRIPTION OF THE DRAWINGS

FIG. 15A is an enlarged vertical cross sectional view of the disc in FIG. 13;

FIG. 15B is an enlarged vertical cross sectional view of the ventilation hole in FIG. 15A;

FIG. 16 is a perspective view as seen from the inside of the disc, which shows a ventilation hole portion in accordance with the third embodiment;

FIG. 21A is an enlarged vertical cross sectional view of the disc in FIG. 19;

FIG. 21B is an enlarged vertical cross sectional view of the ventilation hole in FIG. 21A;

FIG. 22 is a perspective view as seen from the inside of the disc, which shows a ventilation hole in FIG. 19;

FIGS. 25A and 25B are vertical cross sectional views which show the first and second conventional discs;

DESCRIPTION OF THE PREFERRED EMBODIMENT

An embodiment in accordance with the first aspect of the present invention will be described below with reference to the first embodiment shown in FIGS. 1 to 4.

Figure 1:
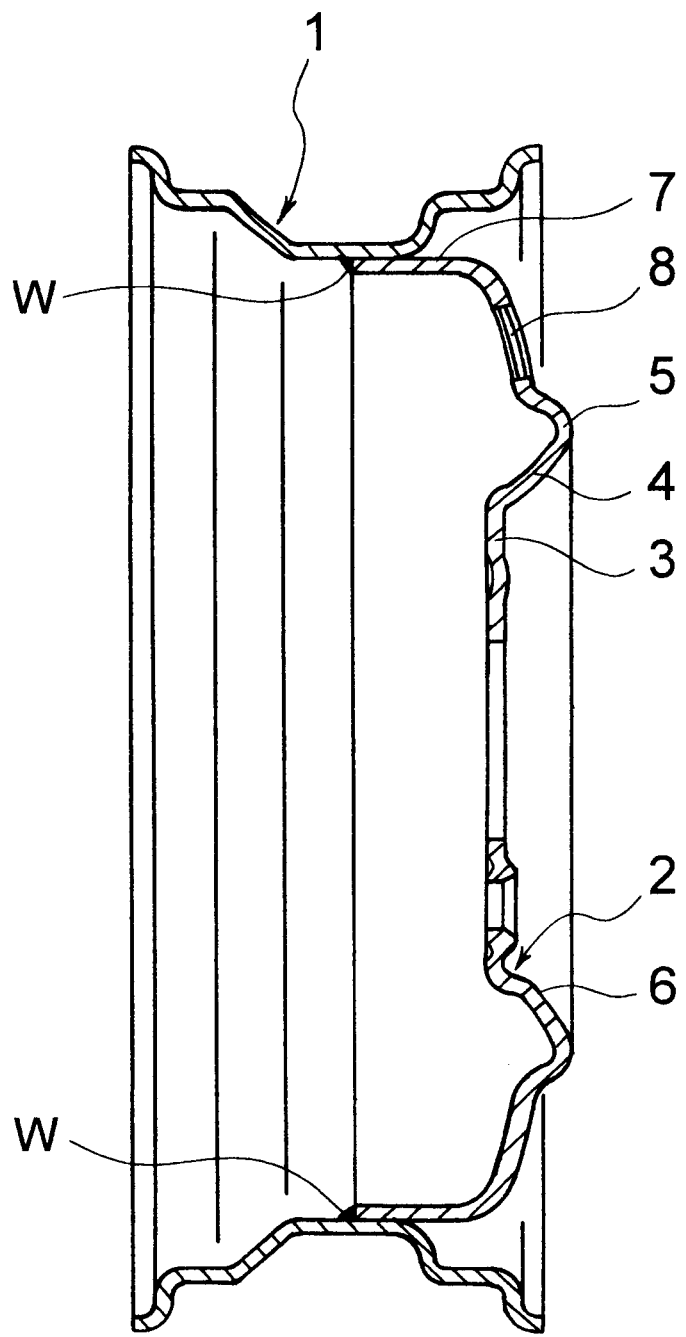
FIG. 1 is a vertical cross sectional view of a disc wheel which shows a first embodiment in accordance with the present invention.
Figure 2:
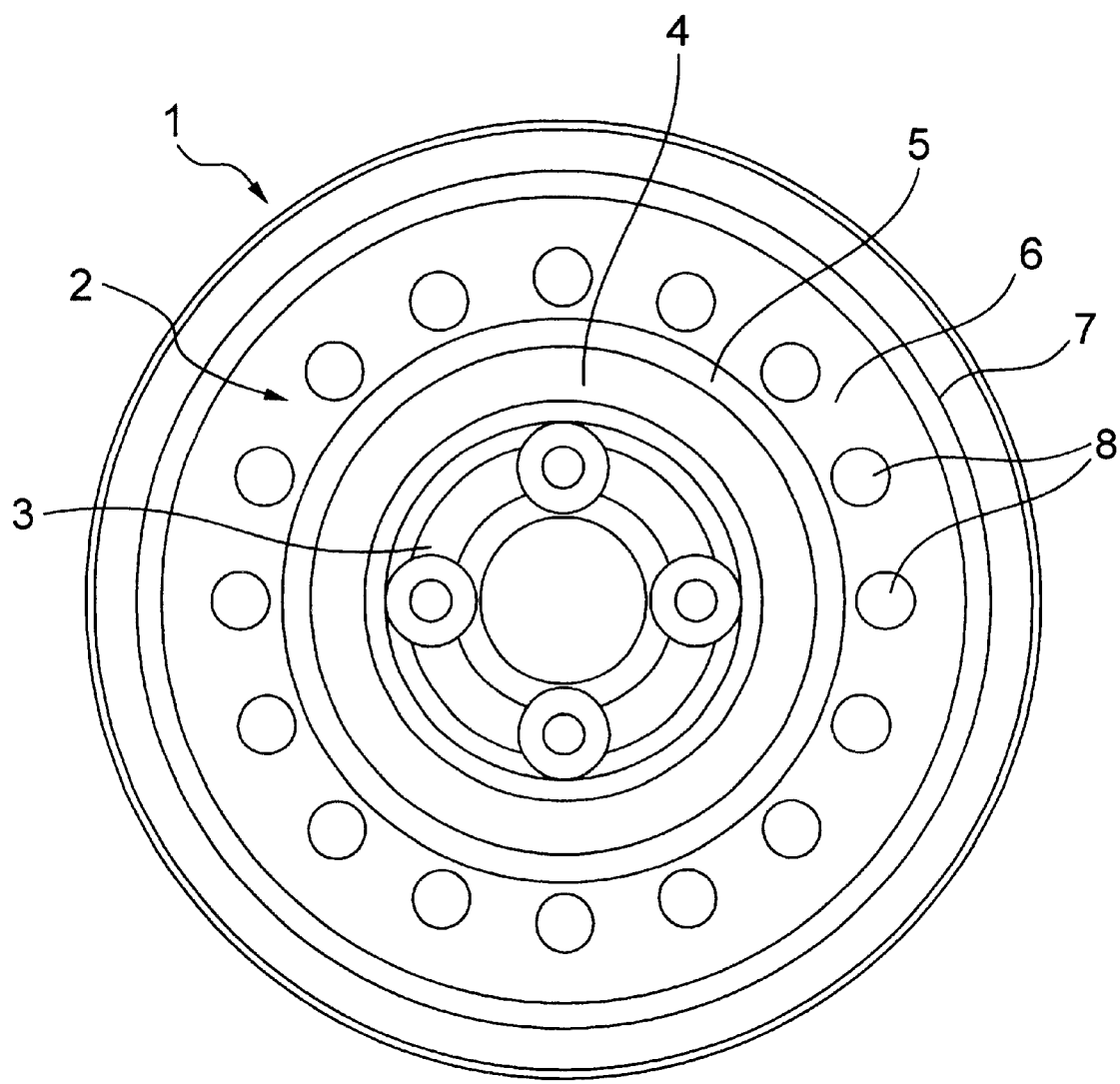
FIG. 2 is a front elevational view of the disc wheel shown in FIG. 1.
Figure 3A:
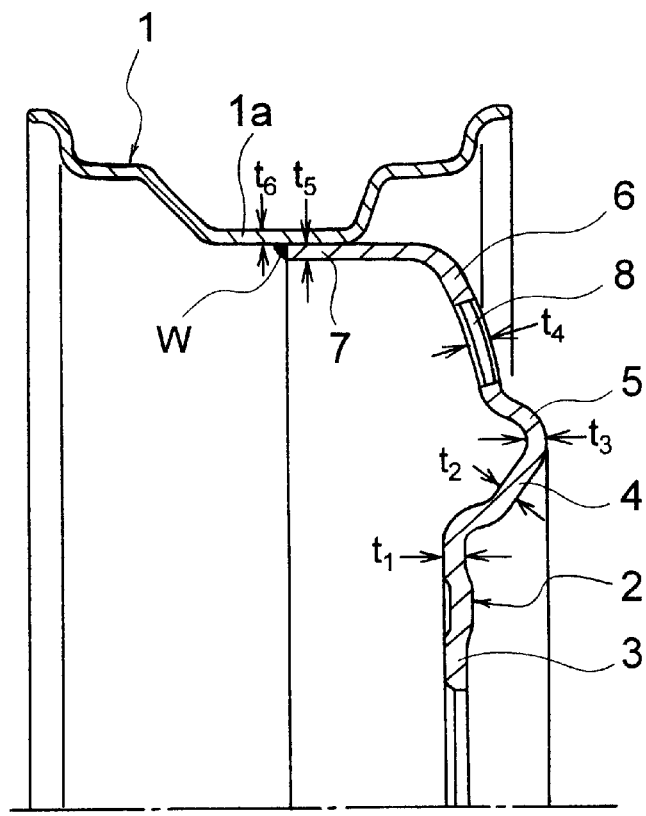
FIG. 3A is an enlarged vertical cross sectional view of a half of the disc in FIG. 1.
Figure 3B:
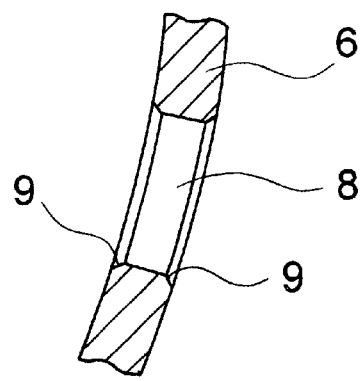
FIG. 3B is an enlarged vertical cross sectional view of a ventilation hole in FIG. 3A.
Figure 4:
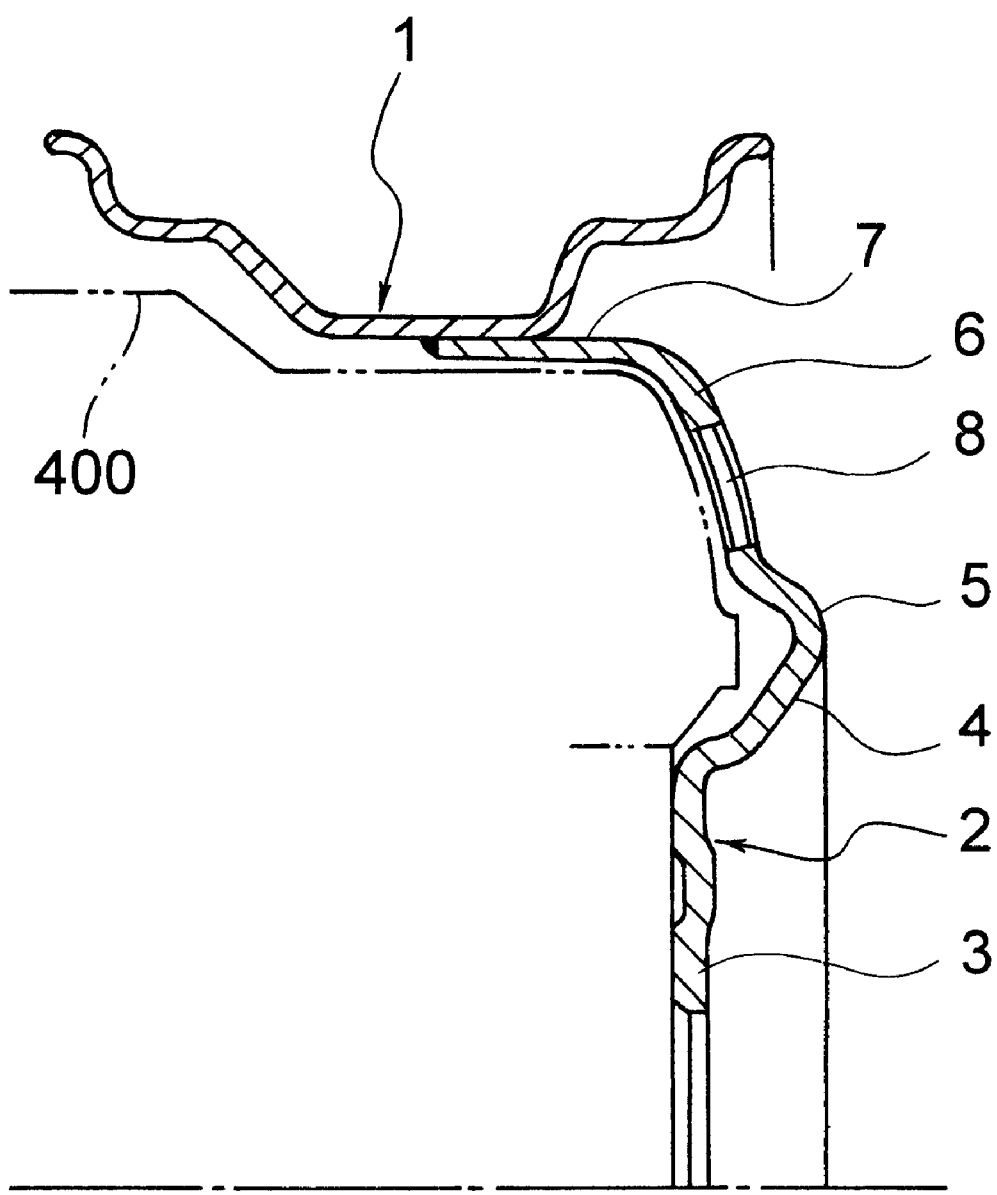
FIG. 4 is an enlarged vertical cross sectional view of a bonding portion between a rim and a disc in FIG. 1.

FIG. 1 is the vertical cross sectional view of the first embodiment of a disc wheel for a passenger car in accordance with the present invention, FIG. 2 is a front elevational view thereof, FIG. 3A is an enlarged vertical cross sectional view of a half of the disc, and FIG. 3B is an enlarged vertical cross sectional view of a ventilation hole.

The disc wheel for the passenger car is composed of a plate-like rim 1 and a plate-like disc 2, a flange portion 7 of the dis 2 and a drop portion 1a of the rim 1, all bonded by a welding W. The rim 1 is formed in accordance with a well-known method.

The dis 2 is made up of by a hub mounting portion 3 extending in a direction perpendicular to the axis thereof, a hat middle portion 4 continuously extending from the hub mounting portion 3 toward the outer side in a radial and axial direction, a hat top portion 5 continuously extending from the hat middle portion 4, a ventilation hole portion 6 continuously extending from the hat top portion 5 toward the inner peripheral surface of the rim and a flange portion 7 continuously extending from the ventilation hole portion 6 and fitted to the inner peripheral surface of the drop portion 1a of the rim 1, all of which are integrally formed with an aluminum alloy plate. Furthermore, ventilation holes 8 are formed in the ventilation hole portion 6 as shown in FIG. 3A, and there most of the circular ventilation holes 8 are formed in a peripheral direction at evenly spaced interval, as shown in FIG. 2

A description of setting the thickness of each of the portions in the dis 2 and the rim 1 follows.

Inherently, since the hat outer peripheral portion has a low stress ratio, the thickness of this portion can be thin but the ventilation hole is formed in this portion such as occurs in passenger cars, the total cross sectional area at that portion is reduced by the ventilation hole thus reducing rigidity and causing stress to the ventilation hole portion 6 which easily causes a crack to form. Accordingly, increasing the thickness of the ventilation hole portion increases the rigidity and reduces the stress ratio of the ventilation hole portion and makes the stress distribution uniform. Furthermore, since the flange portion 7 disposed near the welding portion has a low stress ratio, the thickness thereof can be thinner.

In conjunction with the above, in an aluminum alloy disc wheel for a passenger car, thickness of each of the elements is set so that an allowable stress distribution becomes uniform in a rotational bending test in accordance with a stress analysis using a finite element method, and the disc is formed in accordance with the thickness distribution mentioned above.

Figure 5:
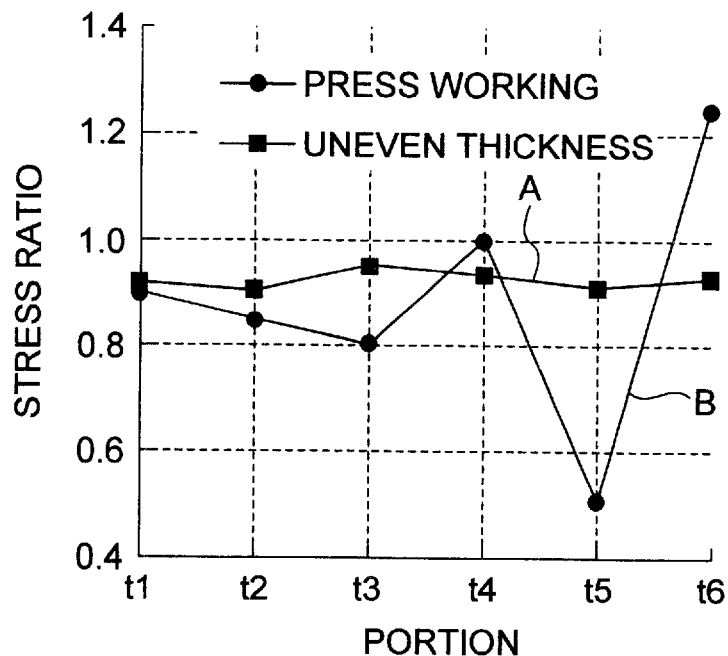
FIG. 5 is a graph which shows the stress ratio of each portion of the disc having an uneven thickness in accordance with the first embodiment of the present invention and a conventional pressed disc with respect to allowable stresses of a disc.

FIG. 5 shows the stress ratio of each of the portions of the disc having an uneven thickness in accordance with the first embodiment mentioned above and a pressed disc with respect to the acceptable stress levels of a disc. In FIG. 5, line A shows the stress ratio of the disc having an uneven thickness in accordance with the present embodiment and line B shows the stress ratio of the disc obtained by conventional press working. In FIG. 5, a point t1 is the hub mounting portion 3, point t2 is the hat middle portion 4, point t3 is the hat top portion 5, point t4 is the ventilation hole portion 6 and point t5 is the flange portion 7 in FIG. 3A. On the basis of the stress distribution mentioned above, the thickness of the hub mounting portion 3 is equal to or less than the original thickness of the raw material, the thicknesses of the hat middle portion 4 and the hat top portion 5 are less than that of the hub mounting portion, the thickness of the ventilation hole portion 6 is equal to the original thickness of the raw material, and the thickness of the flange portion 7 is less than the thickness of any portions between the hub mounting portion and the ventilation hole portion, whereby the dis 2 is formed.

More particularly, the thickness ratio is optimally set so that when setting the thickness of the raw material of the disc to 1, the thickness t1 of the hub mounting portion 3 is between 0.8 and 1.0, the thickness t2 of the hat middle portion 4 is between 0.75 and 0.90, the thickness t3 of the hat top portion 5 is between 0.75 and 0.90, the thickness t4 of the ventilation hole portion 6 is 1.0, and the thickness t2 of the flange portion 7 near the welding portion is between 0.5 and 0.7. Moreover, the thickness t6 of the drop portion 1a in the rim 1 is between 0.4 and 0.7. The rim 1 and the dis 2 formed on the basis of the differences in thickness are shown in FIG. 3A.

Furthermore, a rounded portion connecting the respective portions in the disc 2 mentioned above is a gradually changing rounded portion.

Figure 6:
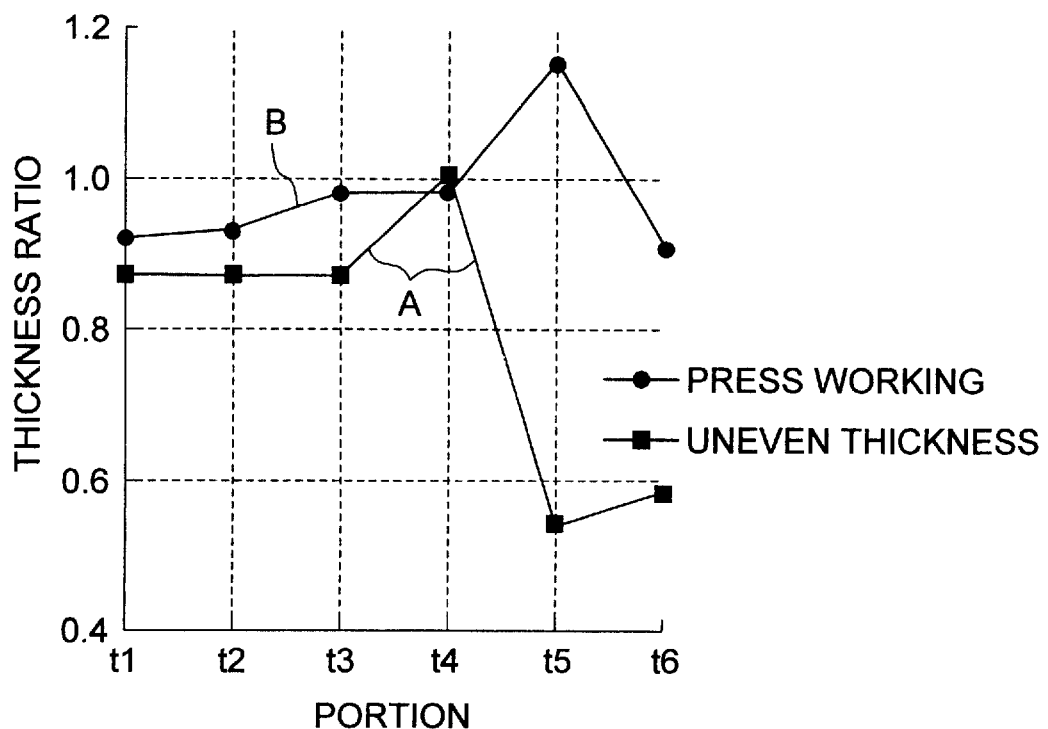
FIG. 6 is a graph which shows the thickness ratio of each portion of the disc having an uneven thickness in accordance with the first embodiment of the present invention and a conventional pressed disc with respect to the thickness of a raw material for the disc.

FIG. 6 is a comparison of the thickness ratio of each portion in the disc having an uneven thickness and the conventional pressed disc with respect to the thickness of the raw material thereof and the thickness ratio of the drop 1a portion in the rim 1. In FIG. 6, line A shows the thickness ratio in the disc being uneven in accordance with the first embodiment of the present invention and a line B shows the thickness ratio of the disc obtained by the conventional press working. In FIG. 6, point t1 is the hub mounting portion 3, point t2 is the hat middle portion 4, point t3 is the hat top portion 5, point t4 is the ventilation portion 6 and a point t5 is the flange portion 7 in 3A.

Setting the thickness ratio in each of the portions as mentioned above improves stress balance without reducing the fatigue life in a rotational bending fatigue test.

Furthermore, except for the ventilation hole portion 6 in the disc 2, the portions can be made with a low stress ratio, thinner than the pressed disc, as shown in FIG. 6, so that wheel can be greatly lightened.

Moreover, since the thickness of the flange portion 7 in the dis 2 is small as mentioned above, set the thickness t6 of the drop portion 1a in the rim 1 can be thin. In particular, the thickness ratio when setting the thickness of the raw material of the disc to 1 is between 0.4 and 0.7. Accordingly, the thickness ratio of the welding portion W between the rim 1 and the dis 2 is reduced, stress concentration in the welding portion W can be reduced, and the stress ratio can be reduced.

Also, the, whole of the rim can be lightened by making the thickness of the whole of the rim 1 less than the thickness of the drop portion 1a in the rim 1 as mentioned above.

In this connection, due to the lightened weight of the rim 1 and the disc 2, in accordance with the disc wheel of the present embodiment, the weight in comparison with the conventional pressed disc wheel can be reduced by 15 to 20%.

A description of the ventilation hole 8 mentioned above follows.

Generally, since the ventilation hole 8 is formed by a piercing process, a sharp edge portion is formed in the periphery of the hole end of the ventilation hole 8. In the sharp edge portion, a notch sensibility is increased and contributes to crack formation due to rotational fatigue, thereby reducing fatigue life.

Then, in the first embodiment of the present invention, a chamfering process is applied to the ventilation hole 8 mentioned above. Reference numeral 9 denotes a chamfered portion formed by the process. The chamfered portion 9 is formed with a width of about 1 mm. In this case, the ventilation hole 8 is formed in a circular shape as shown in FIG. 2, and the chamfered portion 9 is formed at an inner peripheral edge and an outer peripheral edge of the ventilation hole 8 as shown in FIG. 3B The influence of the notch is reduced by forming the chamfered portion 9, to prevent cracking from the ventilation hole 8 due to notch sensibility.

In this case, the ventilation hole can either be an oval shape or a rectangular shape.

Here, a locking die forging is employed as a method of processing portions 3 to 7 in the dis 2 to an uneven thickness in accordance with the first embodiment of the present invention mentioned above, but, a spinning process may be employed. Thereafter, the ventilation hole 8 is pierced by a press working after which a chamfering process is performed.

Additionally, although the embodiment mentioned above corresponds to an embodiment executed by using a plate-like aluminum alloy, the present invention can be applied to a steel plate disc wheel As mentioned above, in accordance with the first aspect of the present invention, in the disc wheel in which the flange of the disc is fitted to the drop portion of the rim, the stress balance is improved and the disc wheel can be made light without reducing the fatigue life in the rotational bending fatigue test since the thicknesses of the portions having a high stress ratio in the disc and the rim are increased and the thicknesses of the portions having a low stress ratio are reduced.

Moreover, since the thickness of the flange in the disc is reduced, stress concentration in the welding portion between the rim and the disc can be reduced even when reducing the thickness of the rim drop portion, so that the fatigue life of the welding portion can be extended. Accordingly, it is possible to reduce the thickness of the whole rim without reducing the strength.

Furthermore, due to the chamfering process in the sharp edge portion of the ventilation hole, cracking in the ventilation hole portion in accordance with the notch sensibility can be prevented, thereby further improving durability of the disc wheel for the passenger car in which the ventilation hole is formed.

The same results are possible without regard to whether the can be obtained in the case that the shape of the ventilation hole is oval ox rectangular.

Next, an embodiment in accordance with the second aspect of the present invention will be described below with reference to a second embodiment shown in FIGS. 7, 8 and 9.

Figure 7:
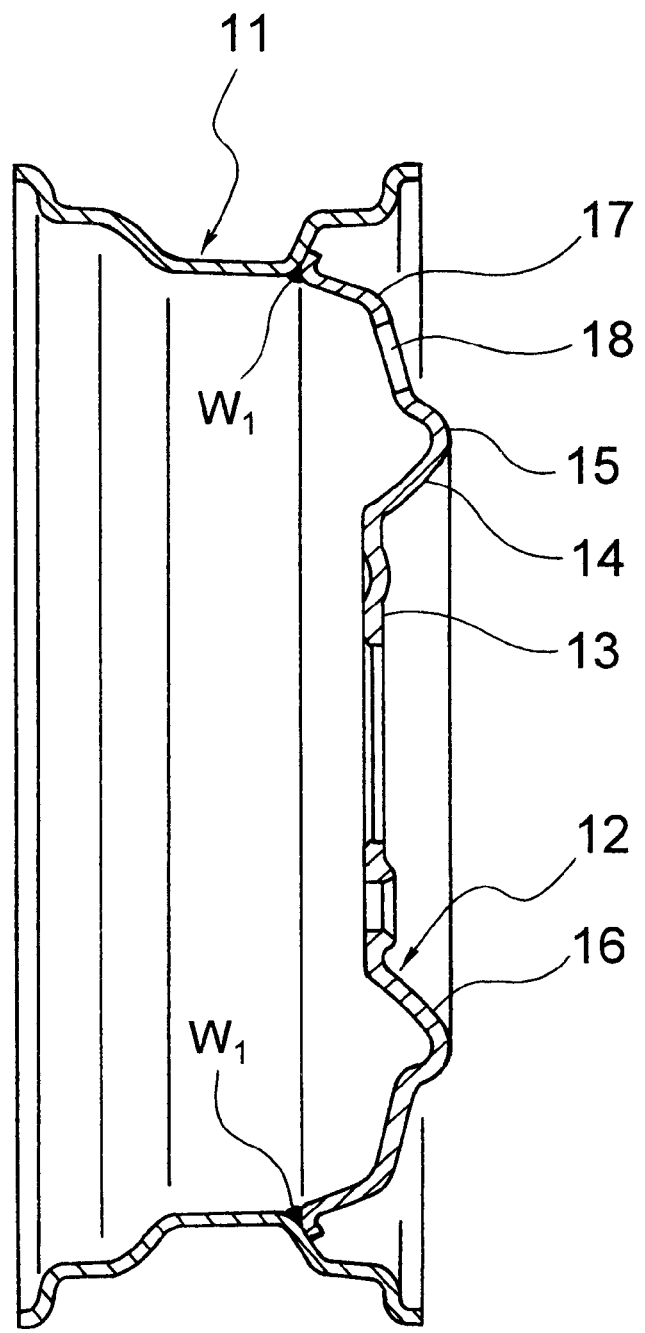
FIG. 7 is a vertical cross sectional view of a disc wheel which shows the second embodiment in accordance with the present invention.
Figure 8:
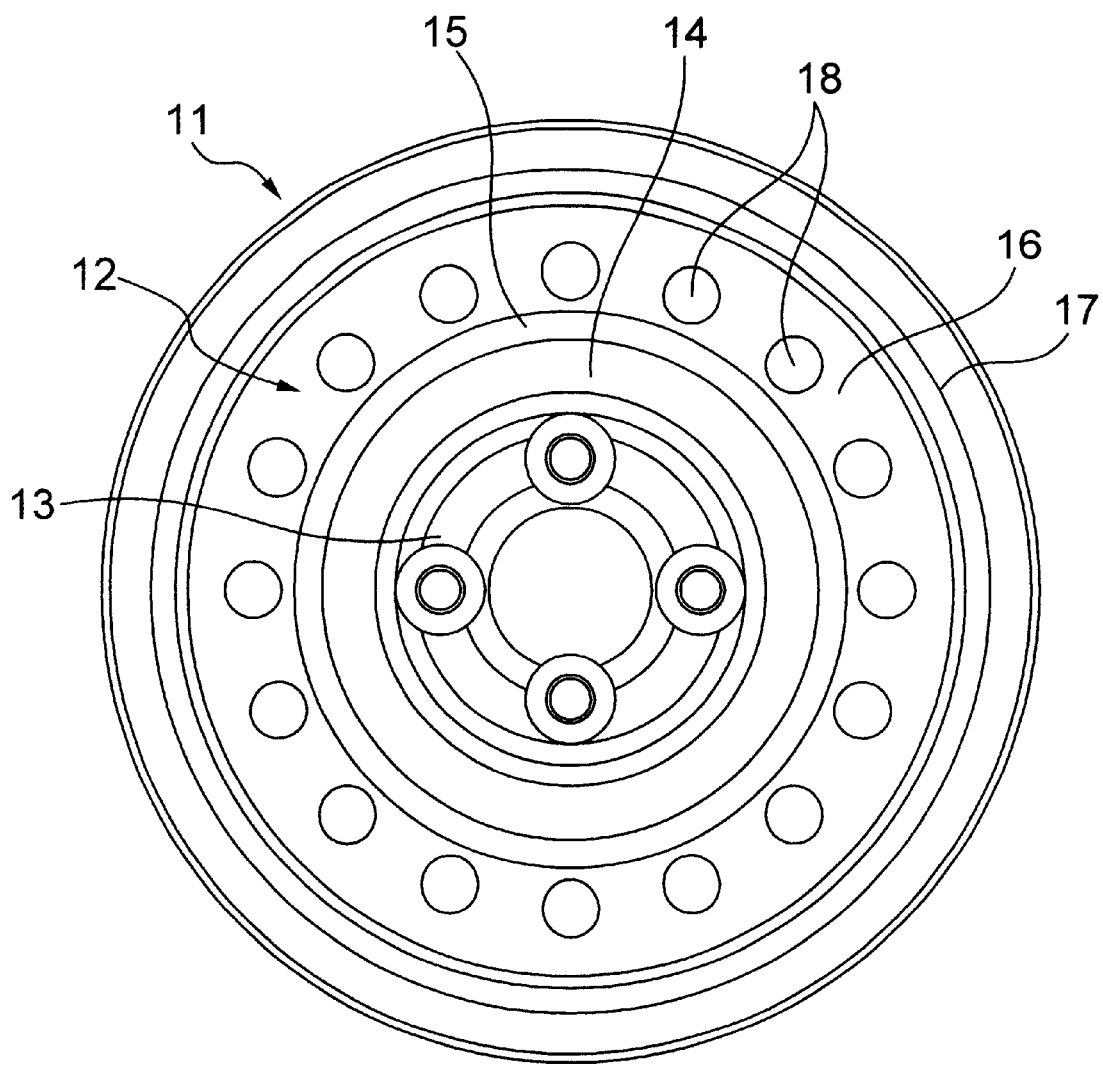
FIG. 8 is a front elevational view of the disc wheel shown in FIG. 7.
Figure 9A:
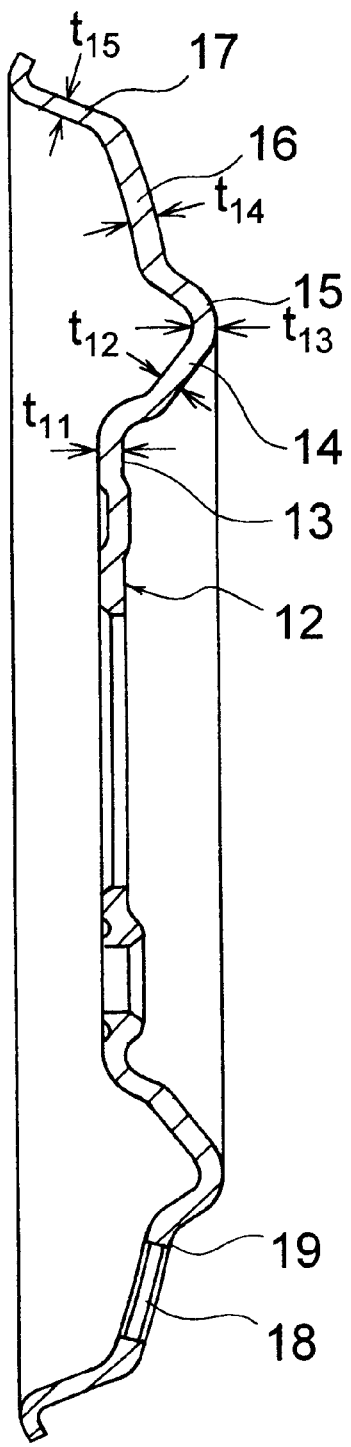
FIG. 9A is an enlarged vertical cross sectional view of the disc in FIG. 7.
Figure 9B:
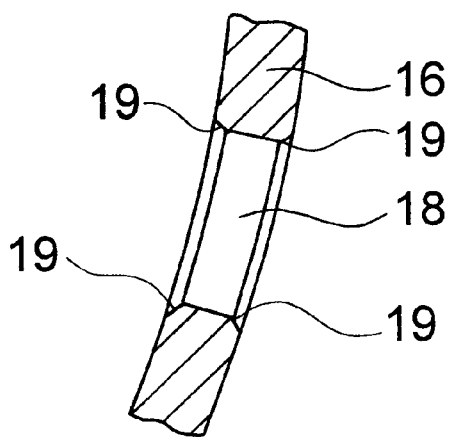
FIG. 9B is an enlarged vertical cross sectional view of a ventilation hole in FIG. 9A.
Figure 10:
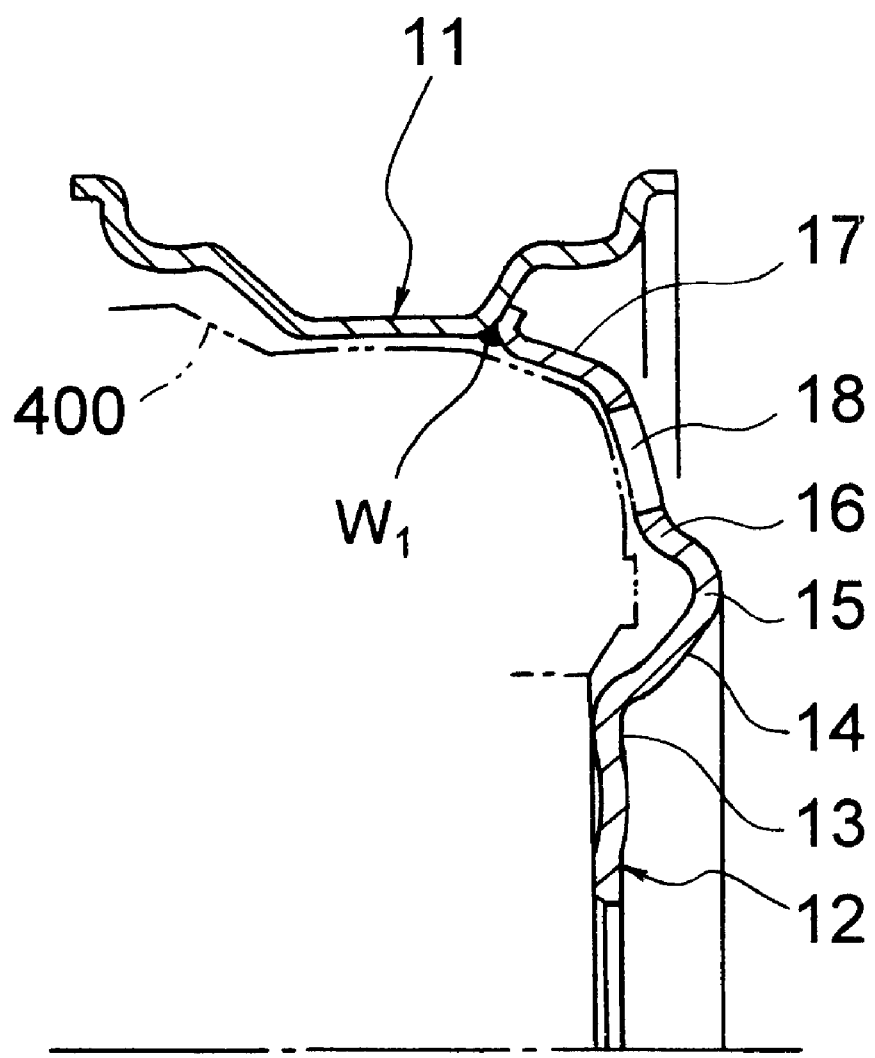
FIG. 10 is an enlarged vertical cross sectional view of the bonding portion between the rim and disc in FIG. 7.

FIG. 7 is a vertical cross sectional view of a second embodiment of the disc wheel for a passenger car in accordance with the present invention, FIG. 8 is a front elevational view thereof, FIG. 9A is an enlarged vertical cross sectional view of the disc, and FIG. 9B is an enlarged vertical cross sectional view of the ventilation hole.

The disc wheel for the passenger car is composed of a plate-like rim 11 and a plate-like disc 12, whereas the flange portion 17 of the disc 12 and the well angle portion of the rim 11 are bonded by welding W1. The rim 11 is formed in accordance with a well-known method.

The disc 12 is composed of a hub mounting portion 13 extending in a direction perpendicular to the axis thereof, a hat middle portion 14 continuously extending from the hub mounting portion 13 toward an outer side in a radial and axial direction, a hat top portion 15 continuously extending from the hat middle portion 14, a ventilation hole portion 16 continuously extending from the hat top portion 15 toward an inner peripheral surface of the rim and a flange portion 7 continuously extending from the ventilation hole portion 6 and fitted to the inner peripheral surface of the rim, these elements being integrally formed by an aluminum alloy plate. Furthermore, ventilation holes 18 are formed in ventilation hole portion 16 as shown in FIG. 9A, of which most of the circular ventilation holes 18 are formed in a peripheral direction at evenly spaced intervals, as shown in FIG. 8.

A description of setting the thickness of each of the portions in the disc 12 follows.

Inherently, since the hat outer peripheral portion has a low stress ratio, the thickness of this portion can be thin but when forming the ventilation hole in a portion such as in a wheel for the passenger car, the total cross sectional area at that portion is reduced by the ventilation hole, rigidity is lowered, stress is concentrated on the ventilation hole portion 16 and a crack is easily generated. Accordingly, increasing the thickness of the ventilation hole portion so as to increase the rigidity reduces the stress ratio of the ventilation hole portion and causes the stress distribution to be more even. Furthermore, the low stress ratio of the flange portion 17 near the welding portion allows for reduced thickness.

Taking the above matters into consideration, in an aluminum alloy disc wheel for a passenger car, thickness of each element is set such that an allowable stress level is evenly distributed in a rotational bending test using a stress analysis with a finite element method, and the disc meets the thickness distribution mentioned above.

Figure 11:
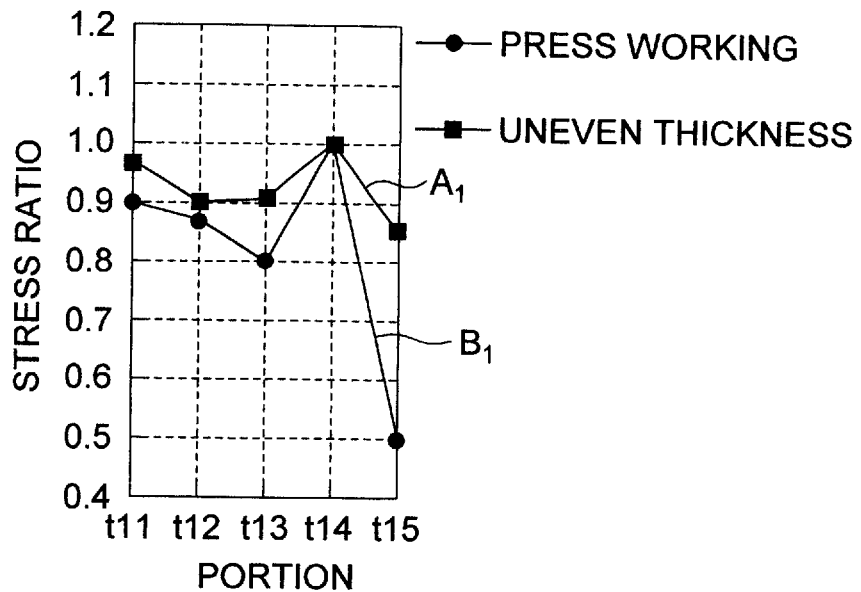
FIG. 11 is a graph which shows the stress ratio of each portion in the disc having an uneven thickness in accordance with the second embodiment of the present invention and a conventional pressed disc with respect to allowable stress levels thereof.

FIG. 11 shows the stress ratio of each portion of the disc having an uneven thickness in accordance with the second embodiment mentioned above and a pressed disc with respect to the allowable stresses of a disc. In FIG. 11, line Al shows the disc stress ratio having an uneven thickness in accordance with the present embodiment with respect to the allowable disc stress and line B1 shows disc stress ratio by a conventional press working with respect to the allowable disc stress. In this case, in FIG. 11, point t11 is the hub mounting portion 13, point t12 is the hat middle portion 14, point t13 is the hat portion 15, point t14 is the ventilation hole portion 16 and point t15 is the flange portion 17 in FIG. 9A.

On the basis of the stress distribution mentioned above, the thickness of the hub mounting portion 13 is set equal to or less than the original thickness of the raw material, the thicknesses of the hat middle portion 14 and the hat top portion 15 are less than that of the hub mounting portion, the thickness of the ventilation hole portion 16 is equal to the original thickness of the raw material, and the thickness of the flange portion 17 is less than the thicknesses of the hat middle portion 14 and the hat top portion 15, that is which is the thinnest portion mentioned above forms disc 12.

More particularly, the thickness ratio is optimized so that when the thickness of the raw material is 1, the thickness t11 of the but mounting portion 13 is between 0.80 and 1.0, the thickness t12 of the hat middle portion 14 is between 0.75 and 0.90, the thickness t13 of the hat top portion 15 is between 0.75 to 0.90, the thickness t14 of the ventilation hole portion 16 is 1.0, and the thickness t15 of the flange portion 17 is between 0.55 and 0.75 The disc formed on the basis of the thickness ratio is shown in FIG. 9A.

Furthermore, a gradually changing rounded portion connects the respective portions mentioned above.

Figure 12:
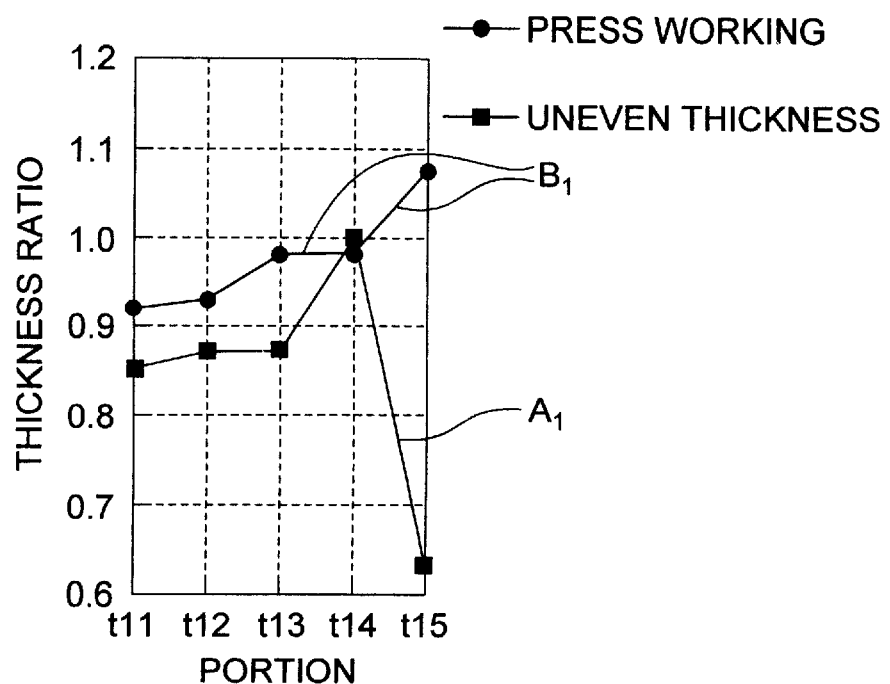
FIG. 12 is a graph which shows the thickness ratio of each portion of disc having an uneven thickness in accordance with the second embodiment of the present invention and a conventional pressed disc with respect to a thickness of the raw material thereof.

FIG. 12 compares the thickness ratio of each portions of the disc having an uneven thickness and the conventional pressed disc with respect to the thickness of the raw material for a disc. In FIG. 12, line A1 shows the thickness ratio in a disc having an uneven thickness and line B1 shows the thickness ratio of a disc obtained by conventional press working. In this case, in FIG. 12, point t11 is the hub mounting portion 13, point t12 is the hat middle portion 14, point t13 is the hat top portion 15, point t14 is the ventilation hole portion 16 and point t15 is the flange portion 17 in FIG. 9A.

By setting the thickness ratio in each portion as mentioned above, stress balance is improved, and fatigue life in a rotational bending fatigue test is not comprised.

Additionally, the can portion have a low stress ratio by portions other than the ventilation hole portion 16 being significantly thinner than the pressed disc, as shown in FIG. 12, so that the wheel can be greatly lightened.

In this connection, in accordance with the disc wheel of the present embodiment, the weight can be reduced 10 to 15% in comparison with a conventional pressed disc wheel.

A description of the ventilation hole 18 mentioned above with reference to FIG. 9B follows.

Generally, as mentioned above, since the ventilation hole 18 is formed by a piercing process, a sharp edge portion is formed in a periphery of the hole end of the ventilation hole 18. In the sharp edge portion, a notch sensibility is increased, which along with rotational fatigue, contributes to cracking and reduced fatigue life.

A chamfering process is then applied to the ventilation hole 18 mentioned above in the second embodiment of the present invention. Reference numeral 19 denotes a chamfered portion formed by the process. The chamfered portion 19 is formed with a width of about 1 mm. In this case, the ventilation hole 18 is formed in a circular shape as shown in FIG. 8, and the chamfered portion 19 is formed at an inner peripheral edge and an outer peripheral edge of the ventilation hole 18 as shown in FIG. 9B.

The influence of the notch is reduced by forming the chamfered portion 19, which prevents a crack from forming in the area of the ventilation hole 18 due to the notch sensibility.

In this case, the shape of the ventilation hole may be either oval or rectangular in addition to the circular shape in the embodiment mentioned above, all of which lead to the same results.

Here, a locking die forging is employed as a method of processing the disc 12 having an uneven thickness in accordance with the second embodiment of the present invention mentioned above, but a spinning process may be employed Although, the embodiment mentioned above corresponds to a plate-like aluminum alloy implemented embodiment, the present invention can also be applied to a steel plate disc wheel.

As mentioned above, in accordance with the second aspect of the present invention, the increased thickness of the portions having a high stress ratio in the disc and the reduced stress ratio of the portions improves the stress balance and lightens the disc wheel without reducing the fatigue life in the rotational bending fatigue test.

Moreover, the chamfering process in the sharp edge portion of the ventilation hole helps to prevent a crack from originating in the ventilation hole portion in accordance with notch sensibility, which thereby improves the durability of the disc wheel for the passenger car in which the ventilation hole is formed.

Next, an embodiment in accordance with the third aspect of the present invention will be described below with reference to a third embodiment shown in FIGS. 13 to 16.

Figure 13:
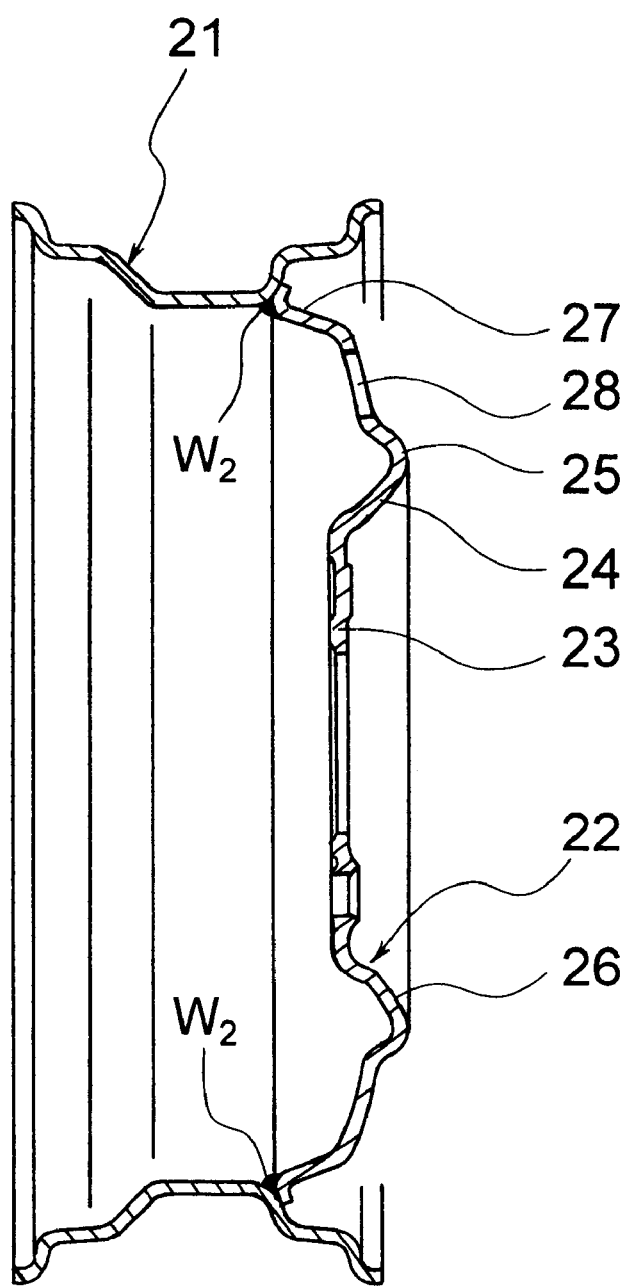
FIG. 13 is a vertical cross sectional view of a disc wheel which shows a third embodiment in accordance with the present invention.
Figure 14:
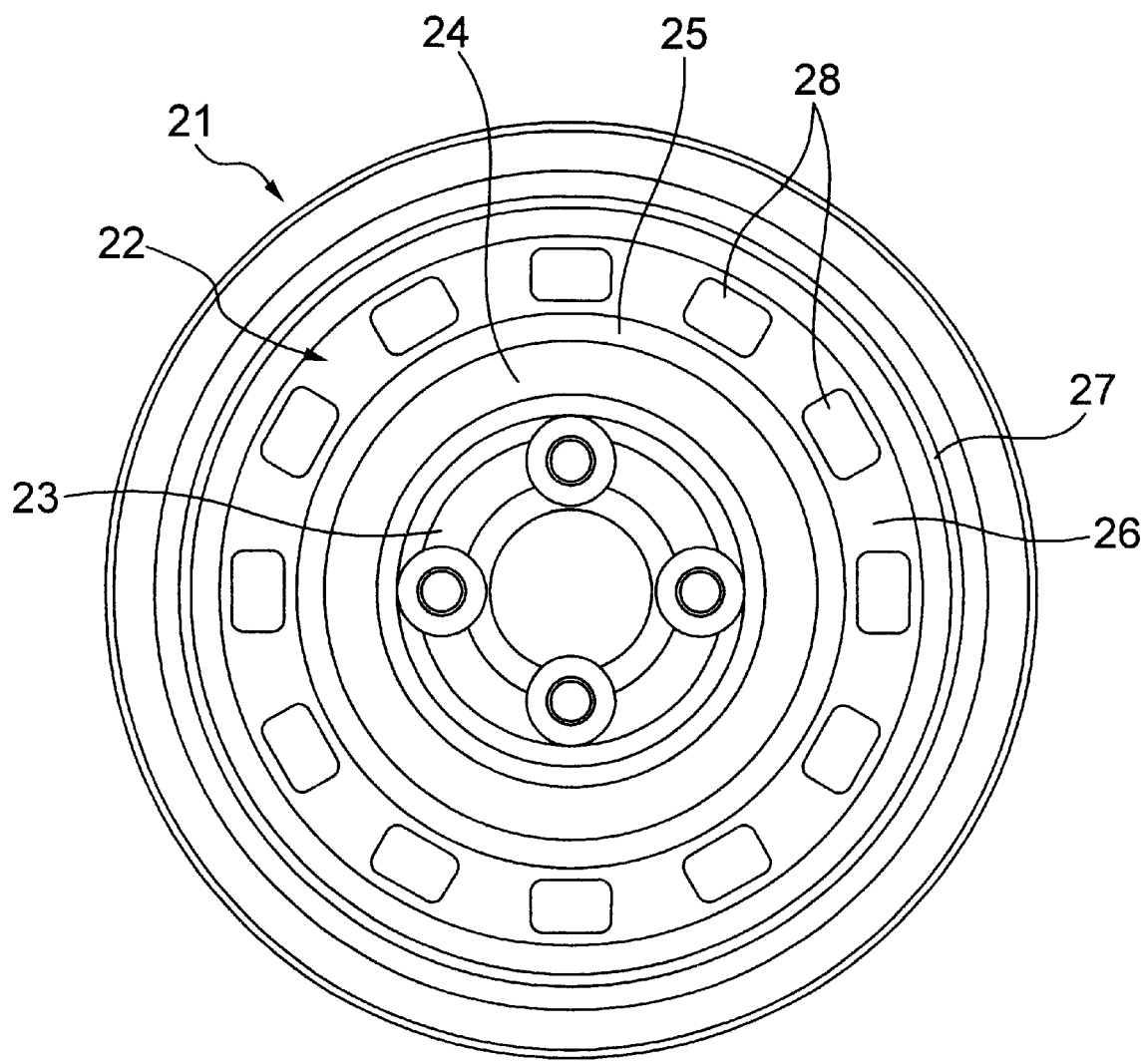
FIG. 14 is a front elevational view of the disc wheel shown in FIG. 13.

FIG. 13 is a vertical cross sectional view of the third embodiment of a disc wheel for a passenger car in accordance with the present invention, FIG. 14 is a front elevational view thereof, FIG. 15A is an enlarged vertical cross sectional view of the disc, and FIG. 15B is an enlarged vertical cross sectional view of a ventilation hole.

The disc wheel for the passenger car is composed of a plate-like rim 21 and a plate-like disc 22, and a flange portion of the dis 22 and a well angle portion of the rim 21 bonded by welding W2. The rim 21 is formed in accordance with a well-known method The disc 22 is composed of a hub mounting portion 23 extending in a direction perpendicular to the axis thereof, a hat middle portion 24 continuously extending from the hub mounting portion 23 toward an outer side in a radial direction and an outer side in an axial direction, a hat top portion 25 continuously extending from the hat middle portion 24, a ventilation hole portion 26 continuously extending from the hat top portion 25 toward an inner peripheral surface of the rim and a flange portion 27 continuously extending from the ventilation hole portion 26 and fitted to the inner peripheral surface of the rim, these elements are integrally formed with an aluminum alloy plate. Furthermore, ventilation holes 28 are formed in ventilation hole portion 26 as shown in FIG. 15A, in which most of the ventilation holes 28 are formed in a rectangular pattern and formed in a peripheral direction at an evenly spaced interval, as shown in FIGS. 14 and 16.

Furthermore, a convex portion 30 is formed exclusively in the periphery of the ventilation hole 28 mentioned above.

A description of setting the thickness of each of the portions in the disc 22 follows.

Although the low stress ratio of the hat outer peripheral portion may cause the thickness of this portion to be thin, the ventilation hole reduces the total cross sectional area at that portion and reduces rigidity which causes stress to the ventilation hole portion 26 that contributes to cracking in the formation of the ventilation holes in the portions such as those in the wheel for the passenger car. Accordingly, the stress ratio of the ventilation hole portion 26 is reduced evenly distribute stress by forming the convex portion 30 exclusively in the periphery of the ventilation hole 28 and increase the thickness of the portion so as to increase the rigidity. Furthermore, the low stress ratio of the flange portion 27 disposed near the welding portion allows the thickness thereof to be thin.

Taking the above matters into consideration, in an aluminum alloy disc wheel for a passenger car, the thickness of each of the elements is set so that an allowable stress is evenly distributed in a rotational bending test, in accordance with a stress analysis using a finite element method, and the disc is formed in such a manner as to comply with the thickness distribution mentioned above.

Figure 17:
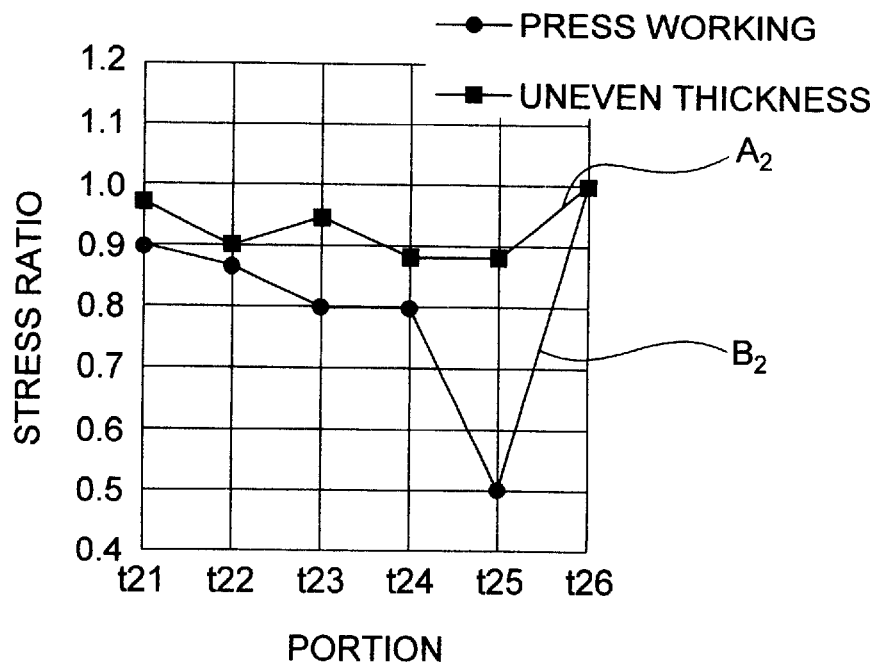
FIG. 17 is a graph which shows the stress ratio of each portion of the disc having an uneven thickness in accordance with the third embodiment of the present invention and a conventional pressed disc with respect to allowable stress levels thereof.

FIG. 17 shows the stress ratio of each of the portions of the disc having an uneven thickness in accordance with the third embodiment mentioned above and a pressed disc with respect to the allowable stresses in a disc. In FIG. 17, line A2 shows the stress ratio in the disc having an uneven thickness in accordance with the present embodiment with respect to the allowable stress of the disc and line B2 shows the stress ratio in the disc from a conventional press working with respect to the allowable stress of a disc. In this case, in FIG. 17, point t21 is the hub mounting portion 23, point t22 is the hat middle portion 24, point t23 is the hat top portion 25, point t24 is the ventilation hole portion 26, point t25 is the flange portion 27 in FIG. 15A and point t26 is the periphery of the ventilation hole 28.

On the basis of the stress distribution mentioned above, the thicknesses of the hub mounting portion 23, the hat middle portion 24 and the hat top portion 25 are substantially equal to the original thickness of the raw material, the thicknesses of the ventilation hole portion 26 and the flange portion 27 are set to be equal to each other and less than the thicknesses of the hub mounting portion 23, the hat middle portion 24 and the hat top portion 25 and the thickness of only the periphery of the ventilation hole 28 is between 1.0 and 1.3 times the thickness of the raw material, whereby the disc 22 is formed.

More particularly, the thickness ratio is optimized so that when setting the original thickness of the raw material of the disc to 1, the thickness t21 of the hub mounting portion 23, the thicknesses t22 of the hat middle portion 24 and the thickness t23 of the hat portion 25 are set to be approximately 1.0. More specifically, the thickness t21 of the hub mounting portion 23 is 1, the thicknesses t22 of the hat middle portion 24 and the thickness t23 of the hat top portion 25 are approximately 1, the thickness t24 of the ventilation hole portion 26 is between 0.6 and 0.8, the thickness t25 of the flange portion 27 near the welding portion is between 0.6 and 0.8, and the thickness t26 of only the periphery of the ventilation hole 28 is between 1.0 and 1.3. The disc formed on the basis of the thickness ratio is shown in FIG. 15A.

In order to increase the thickness of the periphery of the ventilation hole 28 mentioned above, the convex portion 30 is formed in the periphery of the ventilation hole 28. The width D2 of the convex portion 30 (refer to FIG. 15B) is set between 1 and 1.5 times the original thickness of the disc raw material.

As mentioned above, it is possible to increase the rigidity by forming the convex portion 30 so as to exclusively increase the thickness of only the periphery of the ventilation hole 28, thereby reducing the stress ratio. In this case, the convex portion 30 is provided in the inner side of the disc 22 in the illustrated embodiment Furthermore, the rounded portion connecting the respective portions mentioned above is a gradually changing rounded portion.

Figure 18:
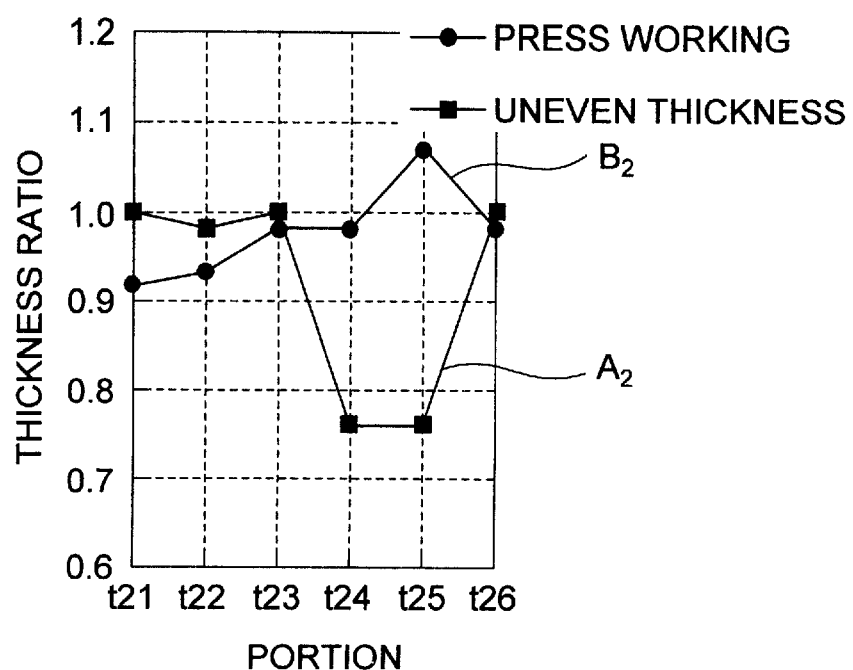
FIG. 18 is a graph which shows the thickness ratio of each portion of the disc having an uneven thickness in accordance with the third embodiment of the present invention and a conventional pressed disc with respect to the thickness of the raw material thereof.

FIG. 18 compares the thickness ratio of each portion the disc having an uneven thickness in accordance with the third embodiment and the conventional pressed disc with respect to the thickness of the raw material for a disc. In FIG. 18, line A2 shows the thickness ratio of a disc with uneven thickness in accordance with the third embodiment of the present invention and line B2 shows the thickness ratio of the disc obtained by the conventional press working. In this case, in FIG. 18, point t21 is the hub mounting portion 23, point t22 is the hat middle portion 24, point t23 is the hat top portion 25, point t24 is the ventilation hole portion 26, point t25 is the flange portion 27 and point 26 is the periphery of the ventilation hole 28 in FIG.

Setting the thickness ratio in each of the portions as mentioned above improves stress balance and does not reduce fatigue life in a rotational bending fatigue test.

Furthermore, the wheel can be greatly lightened by making the portion with a low stress ratio and the ventilation hole portion 26 and the flange portion 27 being significantly thinner than the pressed disc, as shown in FIG. 18.

In this connection, in accordance with the disc wheel of the present embodiment, the weight in comparison with the conventional pressed disc wheel can be reduced between 15 and 20%.

A description of the ventilation hole 28 mentioned above follows.

Generally, as mentioned above, the ventilation hole 28 formed by a piercing process causes a sharp edge portion to be formed in the periphery of the hole end of the ventilation hole 28. In the sharp edge portion, increased notch sensibility and rotational fatigue contribute to cracking, thereby reducing fatigue life.

Then, in the third embodiment of the present invention, a chamfering process is applied to the ventilation hole 28 in the same manner as that of the other embodiments mentioned above. Reference numeral 29 denotes a chamfered portion formed by the process. The chamfered portion 29 is formed with a width of approximately 1 mm. In this case, the ventilation hole 28 is formed in a rectangular image as shown in FIGS. 14 and 16, and the chamfered portion 29 is formed at an inner peripheral edge and an outer peripheral edge of the ventilation hole 28 as shown in FIG. 15B.

Forming the chamfered portion 29 reduces the influence of the notch to prevent a crack starting from the ventilation hole 28 due to notch sensibility.

Here, a locking die forging is employed as a method of processing the uneven thickness of the disc 22 in accordance with the third embodiment of the present invention mentioned above but the uneven thickness of portions 23 to 27 mentioned above can be formed by a spinning process and the convex portion 30 can be formed by making an excess metal by means of an upsetting process so as to increase thickness.

Furthermore, the embodiment mentioned above corresponds to an embodiment executed by a plate-like aluminum alloy and the present invention can be applied to a steel plate disc wheel.

As mentioned above, in accordance with the third aspect of the present invention, the increased thicknesses of the portions having a high stress ratio in the disc and the reduced thicknesses of the portions having a low stress ratio, and improved stress balance disc wheel to be lightened without reducing the fatigue life in the rotational bending fatigue test.

Moreover, the chamfering process in the sharp edge portion of the ventilation hole can prevent a crack from generating from the ventilation hole portion in accordance with the notch sensibility, thereby further improving the durability of the disc wheel for the passenger car in which the ventilation holes are formed.

In this case, the shape of the ventilation hole may either be circular or oval in addition to the rectangular image in the embodiment mentioned above, and the same results can be obtained if the shape of the ventilation hole is circular or oval.

Furthermore, an embodiment in accordance with the fourth aspect of the present invention will be described below with reference to a fourth embodiment shown in FIGS. 19 to 22.

Figure 19:
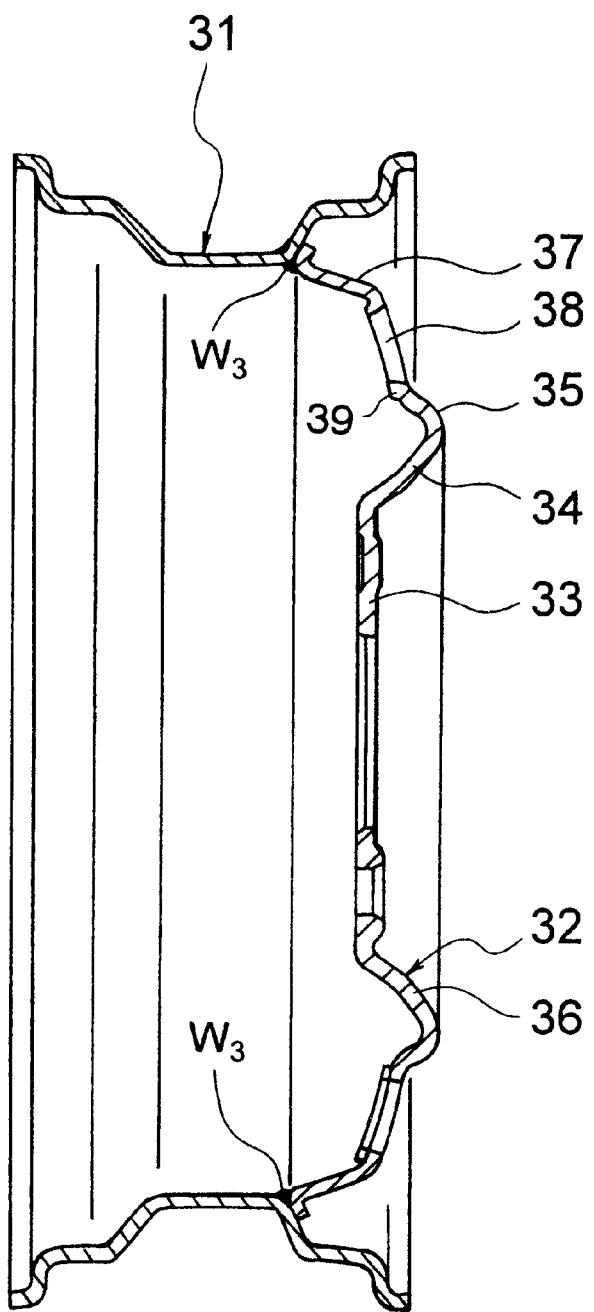
FIG. 19 is a vertical cross sectional view of a disc wheel which shows the fourth embodiment in accordance with the present invention.
Figure 20:
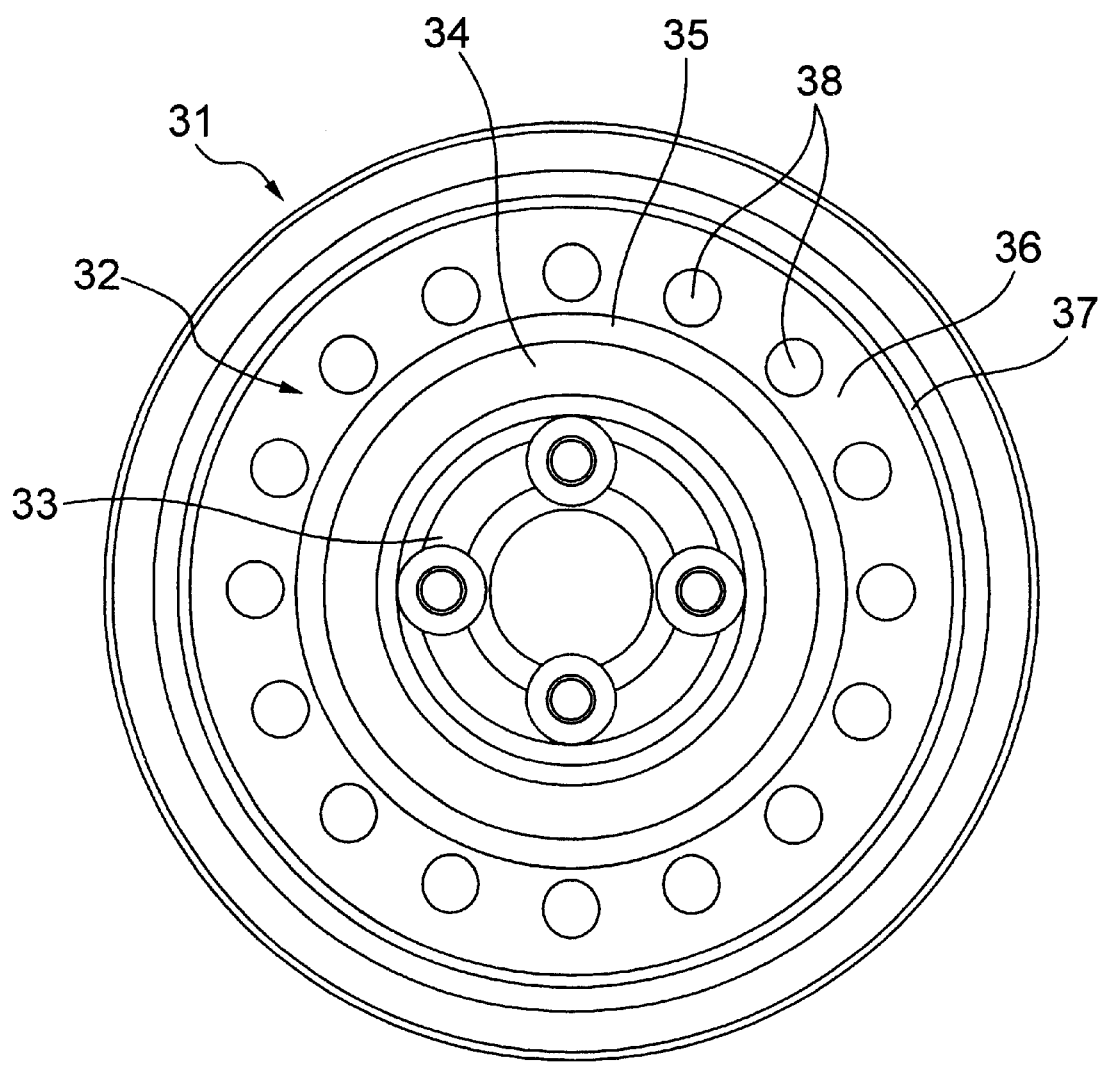
FIG. 20 is a front elevational view of the disc wheel shown in FIG. 19.

FIG. 19 is a vertical cross sectional view of the fourth embodiment of a disc wheel for a passenger car in accordance with the present invention, FIG. 20 is a front elevational view thereof, FIG. 21A is an enlarged vertical cross sectional view of the disc, and FIG. 21B is an enlarged vertical cross sectional view of a ventilation hole The disc wheel for the passenger car is composed of a plate-like rim 31 and a plate-like disc 32, and a flange portion of the disc 32 and a well angle portion of the rim 31 bonded by a welding W3. The rim 31 is formed in accordance with a well-known method.

The disc 32 is composed of a hub mounting portion 33 extending in a direction perpendicular to the axis thereof, a hat middle portion 34 continuously extending from the hub mounting portion 33 toward the outer side in a radial direction and the outer side in an axial direction, a hat top portion 35 continuously extending from the hat middle portion 34, a ventilation hole portion 36 continuously extending from the hat top portion 35 toward the inner peripheral surface of the rim and a flange portion 37 continuously extending from the ventilation hole portion 36 and fitted to the inner peripheral surface of the rim 31, the elements thereof integrally formed with an aluminum alloy plate. Furthermore, ventilation holes 38 are formed in the ventilation hole portion 36 as shown in FIG. 21A, and most of the circular ventilation holes 38 are formed in a peripheral direction at an evenly spaced interval, as shown in FIGS. 20 and 22.

A description of setting the thickness of each of the portions in the disc 32 follows.

Inherently, since the hat outer peripheral portion has a low stress ratio, the thickness of this portion may be thin, but the ventilation hole reduces the total cross sectional area at that portion thereby reducing rigidity and concentrating stress on the ventilation hole portion 36 which contributes to cracking when forming the ventilation hole in the portion such as in the wheel for the passenger car. Accordingly, bending the inner peripheral edge of the ventilation hole 38 in the ventilation hole portion 36 and increasing the thickness of the inner peripheral surface of the ventilation hole 38 by a bent portion 39 to increase the rigidity reduces the stress ratio of the ventilation hole portion 36 so as to make stress distribution even. Moreover, the low stress ratio of the flange portion 37 disposed near the welding portion the thickness thereof to be thin.

Taking the above matters into consideration in an aluminum alloy disc wheel for a passenger car, the thickness of each element is set so that an allowable stress distribution becomes even in a rotational bending test in accordance with a stress analysis using a finite element method, and the disc is formed in such a manner to comply with the thickness distribution mentioned above.

Figure 23:
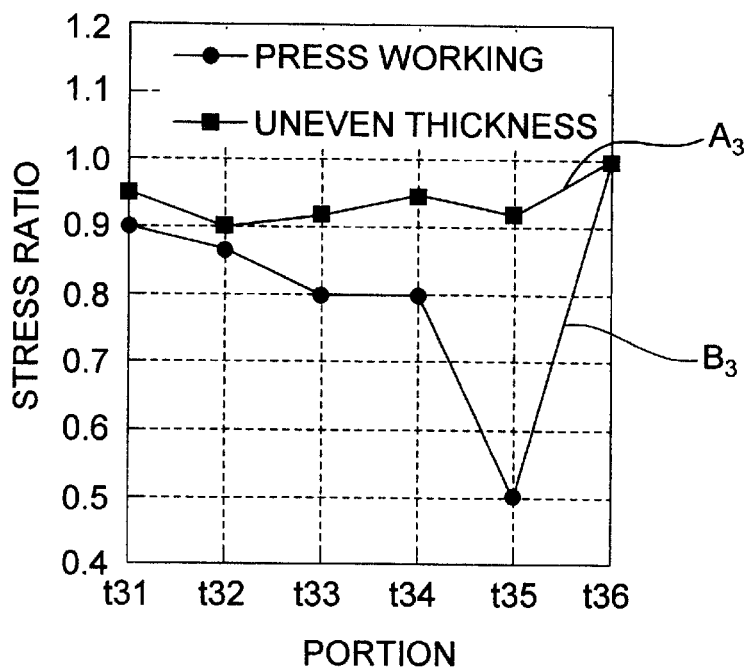
FIG. 23 is a graph which shows the stress level of each portion of the disc having an uneven thickness in accordance with the fourth embodiment of the present invention and a conventional pressed disc with respect to allowable stress levels.

FIG. 23 shows the stress ratio of each portion of the disc having an uneven thickness in accordance with the fourth embodiment mentioned above and a pressed disc with respect to the allowable stress levels of a disc. In FIG. 23, line A3 shows the stress ratio of a disc having an uneven thickness in accordance with the present embodiment with respect to the allowable stress of a disc, and line B3 shows the stress ratio in a disc from a conventional press working with respect to the allowable stress level of a disc. In this case, in FIG. 23, point t31 is the hub mounting portion 33, point t32 is the hat middle portion 34, point t33 is the hat top portion 35, point t34 is the ventilation hole portion 36 and point t35 is the flange portion 37 in FIG. 21A. Furthermore, point t36 is the peripheral portion in the ventilation hole 38

On the basis of the stress distribution mentioned above, the thickness of the portion from the hub mounting portion 33 via the hat middle portion 34 to the hat top portion 35 is set to be substantially equal to the original thickness of the raw material, the thicknesses of the portion from the hat top portion 35 to the ventilation hole portion 36 and the flange portion 37 are set to be less than that of the hub mounting portion 33, and the edge of the periphery of the ventilation hole 38 is bent so as to set the thickness thereof greater than the hub mounting portion 33 by the bent portion 39, which forms the disc 31.

More particularly, the thickness ratio is optimized so that the thickness of the raw material of the disc is 1,the thickness t31 of the hub mounting portion 33 is approximately 1, the thickness t32 of the hat middle portion 34 is approximately 1, the thickness t33 of the hat top portion 35 is approximately 1, the thickness t34 of the ventilation hole portion 36 is between 0.6 and 0.8, the thickness of the flange portion 37 near the welding portion is between 0.6 and 0.8, and the thickness in the bending direction of the bent portion 39 formed at the peripheral edge of the ventilation hole 38 by bending process is between 1.5 and 2.0. The disc formed on the basis of the thickness ratio is shown in FIG. 21A.

Figure 24:
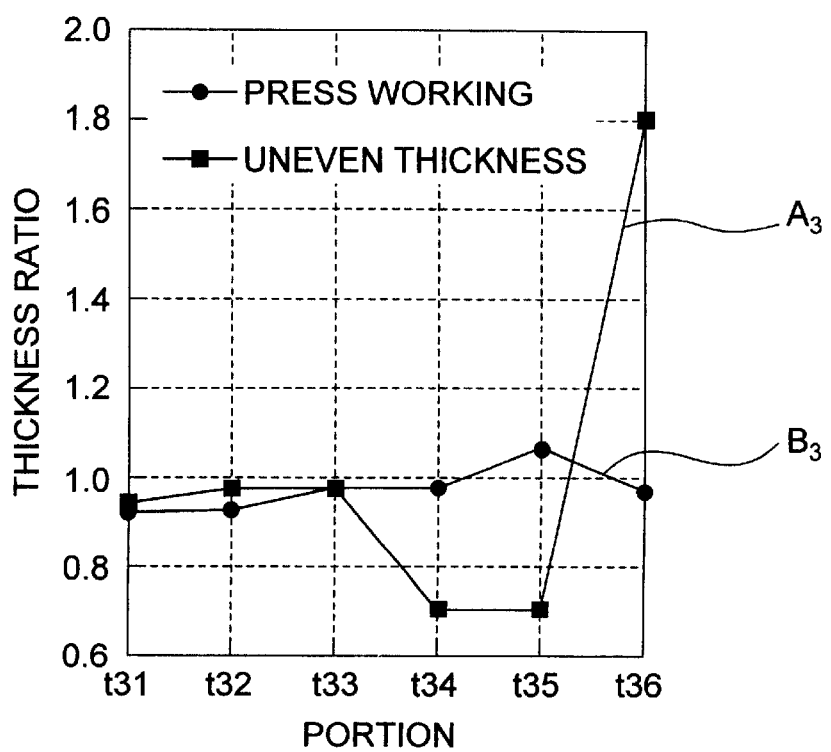
FIG. 24 is a graph which shows the thickness ratio of each portion of the disc having an uneven thickness in accordance with the fourth embodiment of the present invention and a conventional pressed disc with respect to the thickness of the raw material thereof.
Figure 26A:
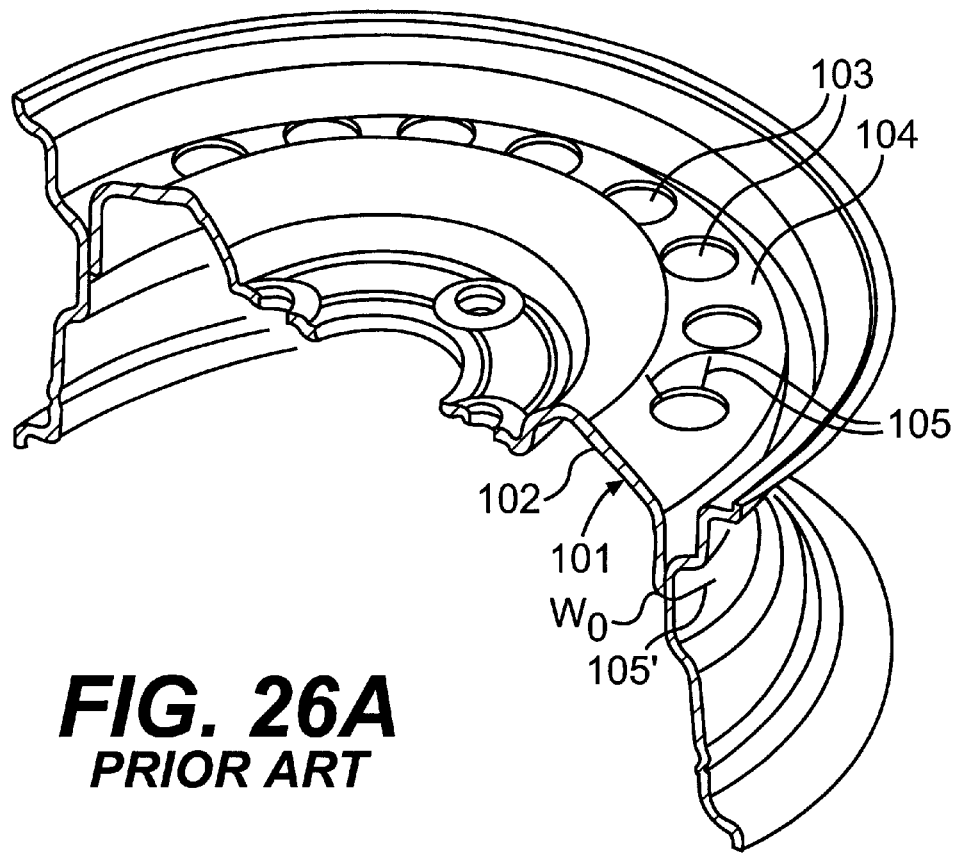
FIGS. 26A to 26C are perspective views which show a crack at a ventilation hole portion and a crack a welding portion in the rim shown in FIGS. 25A and 25B.
Figure 26B:
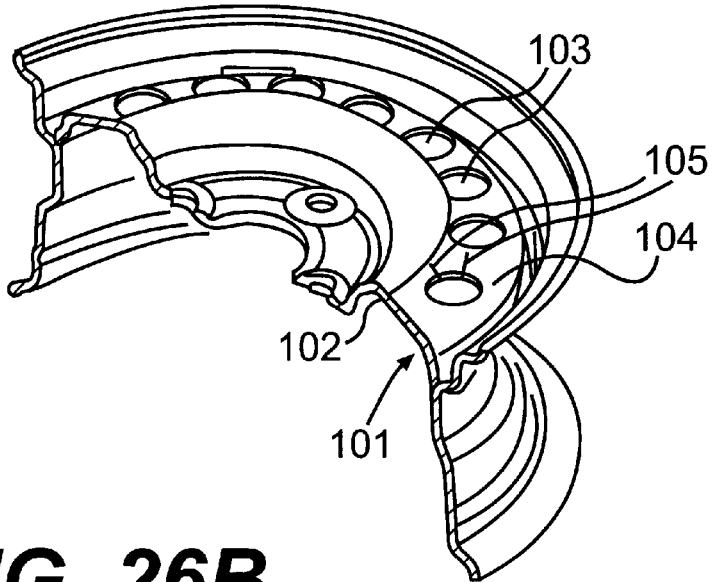
Figure 26C:
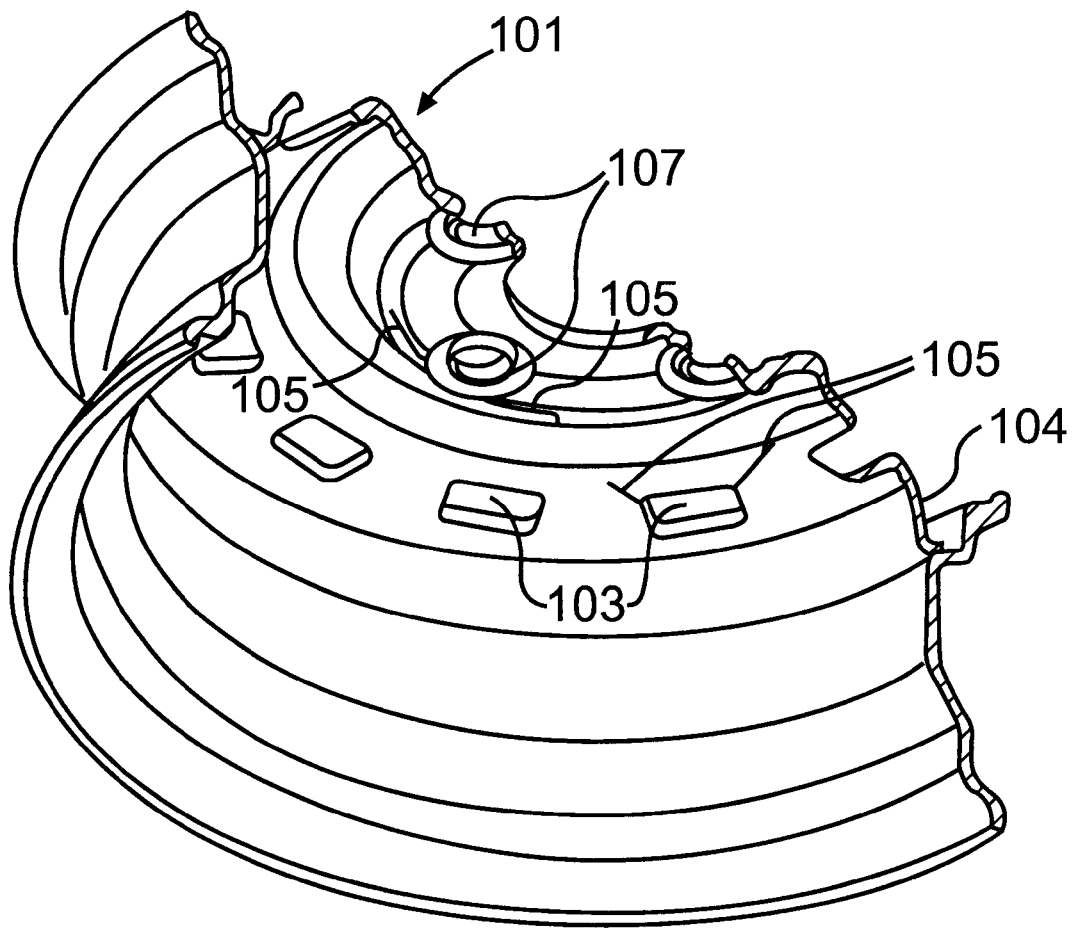
Figure 27:
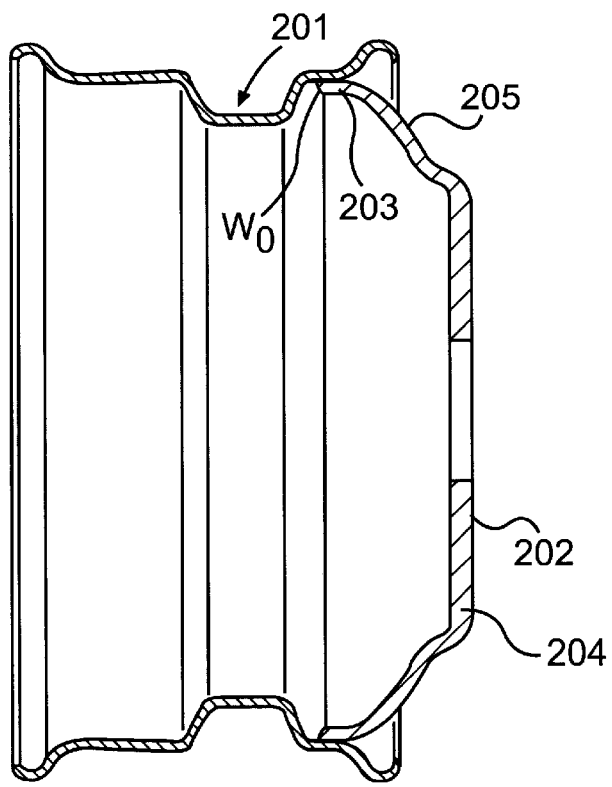
FIG. 27 is a vertical cross sectional view of a disc wheel in which another conventional disc is fitted to a rim.
Figure 28:
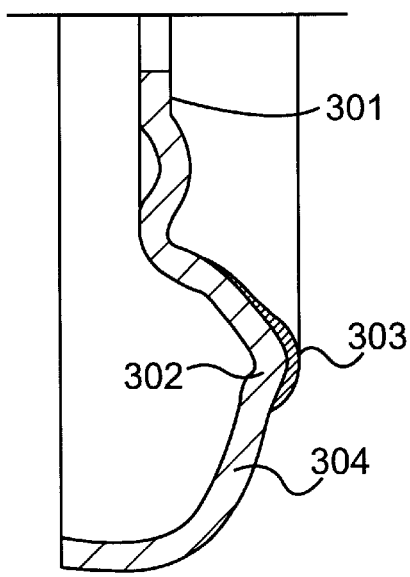
FIG. 28 is an enlarged vertical cross sectional view which shows the other conventional disc.

Also, a rounded portion connecting the respective portions mentioned above is a gradually changing rounded portion FIG. 24 compares the thickness ratio of each portions of the disc having an uneven thickness in accordance with the fourth embodiment and the conventional pressed disc with respect to the thickness of the raw material for a disc. In FIG. 24, line A3 shows the thickness ratio of the disc having an uneven thickness and line B3 shows the thickness ratio of the disc obtained by the conventional press working. In this case, in FIG. 24, point t31 is the hub mounting portion 33, point t32 is the hat middle portion 34, point t33 is the hat top portion 35, point t34 is the ventilation hole portion 36 and point t35 is the flange portion 37 in FIG. 21A. Furthermore, point t36 is the periphery of the ventilation hole 38 which is the bent portion 39.

Setting the thickness ratio in each of the portions as mentioned above improves stress balance, and does not reduce a fatigue life in a rotational bending fatigue test.

Furthermore, it is possible to make the portion with a low stress ratio in which the ventilation hole portion 36 and the flange portion 37 are significantly thinner than the pressed disc, as shown in FIG. 24, thereby greatly lightening the wheel.

Moreover, in accordance with the disc wheel of the present embodiment, the weight in comparison with the conventional pressed disc wheel can be reduced 15 to 20%.

Also, the piercing press that forms the ventilation hole causes a sharp edge portion to be formed in the periphery of the hole end of the ventilation hole. Notch sensibility is increased in the sharp edge portion and causes cracking due to rotational fatigue, thereby reducing fatigue life.

However, the influence of the notch is reduced by burring the inner periphery of the ventilation hole 38, to prevent a crack starting from the ventilation hole 38 due to the notch sensibility.

In this case, the ventilation hole may either be oval or rectangular in addition to the circular shape as in the embodiments mentioned above, all of which lead to the same results.

Here, although locking die forging is employed as a method of processing the portions 33 to 37 in the disc 32 to an uneven thickness in accordance with the first embodiment of the present invention mentioned above, a spinning process may be employed. In any circumstance thereafter, a press working pierces the ventilation hole 38 and a burring process is performed so as to form the bent portion 39.

Furthermore, although the embodiment mentioned above corresponds to an embodiment executed by using a plate-like aluminum alloy, however, the present invention can be applied to a steel plate disc wheel.

As mentioned above, in accordance with the fourth aspect of the present invention, the increased thickness of the portions having a high stress ratio and the reduced thickness of the portions having a low stress ratio improves the stress balance and allows the disc wheel to be lightened without reducing the fatigue life in the rotational bending fatigue test Moreover, hemming the periphery of the ventilation hole permits a sharp edge portion in the ventilation hole and it is possible to prevent the crack from generating from the ventilation hole portion in accordance with the notch sensibility, thereby further improving the durability of the disc wheel for the passenger car in which the ventilation holes are formed.

What is claimed is:

1. A disc wheel for a passenger car comprising a rim and a disc, said disc having a hub mounting portion extending in a direction perpendicular to an axis thereof, a hat middle portion continuously extending from said hub mounting portion toward an outer side in a radial direction and an outer side in an axial direction, a hat top portion continuously extending from said hat middle portion, a ventilation hole portion continuously extending from said hat top portion toward an inner peripheral surface of the rim and a flange portion continuously extending from said ventilation hole portion and fitted to the inner peripheral surface of the rim, and said rim inner peripheral surface and the disc flange being welded, wherein a thickness of said disc wheel is varied in a diametrical direction at at least one of said hub mounting portion, the hat middle portion, the hat top portion, the ventilation hole portion and the flange portion, wherein the thickness of said hub mounting portion is equal to or smaller than an original thickness of a raw material, the thicknesses of said hat middle portion and the hat top portion are smaller than that of the hub mounting portion, the thickness of said ventilation hole portion is the original thickness of the raw material, and the thickness of said flange portion is smaller than the thickness of any portions between said hub mounting portion and the ventilation hole portion.

2. A disc wheel for a passenger car as claimed in claim 1, wherein when setting the thickness of the raw material of said disc to 1, the thickness of the hub mounting portion is 0.8 to 1.0, the thicknesses of said hat middle portion and the hat top portion are 0.75 to 0.90, the thickness of the ventilation hole portion extending from said hat top portion to the flange portion is 1.0, the thickness of said flange portion is 0.5 to 0.7, and a rounded portion connecting the respective portions is a gradually changing rounded portion.

3. A disc wheel for a passenger car as claimed in claim 2, wherein a thickness of a drop portion in said rim may be set to 0.4 to 0.7 when the thickness of the raw material of said disc is 1.

4. A disc wheel for a passenger car as claimed in claim 1, wherein a sharp edge in a ventilation hole formed in said ventilation hole portion is beveled.

5. A disc wheel for a passenger car as claimed in claim 2, wherein a sharp edge in a ventilation hole formed in said ventilation hole portion is beveled.

6. A disc wheel for a passenger car as claimed in claim 3, wherein a sharp edge in a ventilation hole formed in said ventilation hole portion is beveled.

7. A disc wheel for a passenger car comprising a rim and a disc, said disc having a hub mounting portion extending in a direction perpendicular to an axis thereof, a hat middle portion continuously extending from said hub mounting portion toward an outer side in a radial direction and an outer side in an axial direction, a hat top portion continuously extending from said hat middle portion, a ventilation hole portion continuously extending from said hat top portion toward an inner peripheral surface of the rim and a flange portion continuously extending from said ventilation hole portion and fitted to the inner peripheral surface of the rim, and said rim inner peripheral surface and the disc flange being welded, wherein a thickness of said disc wheel is varied in a diametrical direction at at least one of said hub mounting portion, the hat middle portion, the hat top portion, the ventilation hole portion and the flange portion, wherein the thickness of said hub mounting portion is equal to or smaller than an original thickness of the raw material, the thicknesses of said hat middle portion and the hat top portion are smaller than that of the hub mounting portion, the thickness of said ventilation hole portion is equal to the original thickness of the raw material, and the thickness of said flange portion is smaller than those of said hat middle portion and the hat top portion.

8. A disc wheel for a passenger car as claimed in claim 7, wherein when setting the thickness of the raw material of said disc to 1, the thickness of the hub mounting portion is 0.8 to 1.0, the thicknesses of said hat middle portion and the hat top portion are 0.75 to 0.90, the thickness of the ventilation hole portion extending from said hat top portion to the flange portion is 1.0, the thickness of said flange portion is 0.55 to 0.75, and a rounded portion connecting the respective portions is a gradually changing rounded portion.

9. A disc wheel for a passenger car as claimed in claim 7, wherein a sharp edge in a ventilation hole formed in said ventilation hole portion is chamfered.

10. A disc wheel for a passenger car as claimed in claim 8, wherein a sharp edge in a ventilation hole formed in said ventilation hole portion is chamfered.

11. A disc wheel for a passenger car comprising a rim and a disc, said disc having a hub mounting portion extending in a direction perpendicular to an axis thereof, a hat middle portion continuously extending from said hub mounting portion toward an outer side in a radial direction and an outer side in an axial direction, a hat top portion continuously extending from said hat middle portion, a ventilation hole portion continuously extending from said hat top portion toward an inner peripheral surface of the rim and a flange portion continuously extending from said ventilation hole portion and fitted to the inner peripheral surface of the rim, and said rim inner peripheral surface and the disc flange being welded, wherein a thickness of said disc wheel is varied in a diametrical direction at at least one of said hub mounting portion, the hat middle portion, the hat top portion, the ventilation hole portion and the flange portion, wherein the thickness of said hub mounting portion, the hat middle portion and the hat top portion is substantially equal to an original thickness of the raw material, the thicknesses of said ventilation hole portion and the flange portion are equal to each other and smaller than that of said hat top portion, and the thickness around said ventilation hole is set to be 1.0 to 1.3 times the original thickness of the raw material and formed in a convex shape.

12. A disc wheel for a passenger car as claimed in claim 11, wherein when setting the thickness of the raw material of said disc to 1, the thicknesses of the hub mounting portion, the hat middle portion and the hat top portion are set to be substantially 1, the thicknesses of said ventilation hole portion and the flange portion are set to 0.6 to 0.8, the thickness of the convex portion around said ventilation hole is set to 1.0 to 1.3, and a rounded portion connecting the respective portions is a gradually changing rounded portion.

13. A disc wheel for a passenger car as claimed in claim 11, wherein a sharp edge in the ventilation hole formed in said ventilation hole portion is chamfered.

14. A disc wheel for a passenger car as claimed in claim 12, wherein a sharp edge in the ventilation hole formed in said ventilation hole portion is chamfered.

15. A disc wheel for a passenger car comprising a rim and a disc, said disc having a hub mounting portion extending in a direction perpendicular to an axis thereof, a hat middle portion continuously extending from said hub mounting portion toward an outer side in a radial direction and an outer side in an axial direction, a hat top portion continuously extending from said hat middle portion, a ventilation hole portion continuously extending from said hat top portion toward an inner peripheral surface of the rim and a flange portion continuously extending from said ventilation hole portion and fitted to an inner peripheral surface of the rim, and said rim inner peripheral surface and the disc flange being welded, wherein a thickness of said disc wheel is varied in a diametrical direction at at least one of said hub mounting portion, the hat middle portion, the hat top portion, the ventilation hole portion and the flange portion, wherein the thickness from said hub mounting portion via the hat middle portion to the hat top portion is substantially equal to the original thickness of the raw material, the thickness from said hat middle portion to the ventilation hole portion and the flange portion are smaller than the thickness of the hub mounting portion, and the inner periphery of said ventilation hole portion is thicker than the hub mounting portion by a burring process.

16. A disc wheel for a passenger car as claimed in claim 15, wherein when setting the thickness of the raw material of said disc to 1, the thickness from the hub mounting portion via the hub middle portion to the hat top portion is set to 1, the thicknesses from said hat top portion to the periphery of the ventilation hole portion and the flange portion are set to 0.6 to 0.8, the thickness of the bent portion at the inner peripheral edge of the hole portion in said ventilation hole portion is set to 1.5 to 2.0, and a rounded portion connecting the respective portions is a gradually changing rounded portion.

* * * * *